United States Patent
Cho et al.

(10) Patent No.: US 7,095,639 B2
(45) Date of Patent: Aug. 22, 2006

(54) INVERTER CIRCUIT HAVING SWITCHING DEVICE WITH GATE DRIVEN BY HIGH-VOLTAGE INTEGRATED CIRCUIT

(75) Inventors: Byoung-chul Cho, Gwangju Metropolitan (KR); Byoung-ho Choo, Seoul (KR); Bum-seok Suh, Puchon (KR)

(73) Assignee: Fairchid Semiconductor Corporation, South Portland, ME (US)

(*) Notice: Subject to any disclaimer, the term of this patent is extended or adjusted under 35 U.S.C. 154(b) by 197 days.

(21) Appl. No.: 10/805,000

(22) Filed: Mar. 19, 2004

(65) Prior Publication Data

US 2004/0190317 A1 Sep. 30, 2004

(30) Foreign Application Priority Data

Mar. 24, 2003 (KR) .................. 10-2003-0018304

(51) Int. Cl.
*H02M 7/537* (2006.01)
(52) U.S. Cl. .................................. 363/131
(58) Field of Classification Search ............ 363/16, 363/55, 95, 131
See application file for complete search history.

(56) References Cited

U.S. PATENT DOCUMENTS

| | | | | |
|---|---|---|---|---|
| 4,685,040 A | * | 8/1987 | Steigerwald et al. | 363/17 |
| 5,502,632 A | * | 3/1996 | Warmerdam et al. | 363/98 |
| 5,666,280 A | * | 9/1997 | Janaswamy et al. | 363/98 |
| 5,723,953 A | | 3/1998 | Nerone et al. | |
| 5,736,774 A | | 4/1998 | Fujihira | |
| 2002/0024827 A1 | * | 2/2002 | Dubhashi et al. | 363/21.01 |

* cited by examiner

*Primary Examiner*—Adolf Berhane
(74) *Attorney, Agent, or Firm*—Sidley Austin LLP

(57) ABSTRACT

Provided is an inverter circuit including a switching device which performs a switching operation corresponding to a gate control signal input to a gate terminal, converts an input DC to an AC, and outputs the AC; an HVIC which inputs the gate control signal to the gate terminal of the switching device; a controller which inputs to the HVIC a control signal for enabling the HVIC to generate the gate control signal; a bootstrap circuit which transmits energy to a high-side region of the HVIC; and an impedance cell which is located between the HVIC and one terminal of the switching device to reduce voltage drop of the high-side HVIC.

14 Claims, 25 Drawing Sheets

FIG. 5

| TYPE | IMPEDANCE CELL | EQUIVALENT RESISTANCE |
|---|---|---|
| A | $R_{E(H)}$ — 431a | a) $R_{on,eq} = R_{E(H)}$<br>b) $R_{off,eq} = R_{E(H)}$ |
| B | 432b / $R_{E(H)}$ 431b | a) $R_{on,eq} = 0$<br>b) $R_{off,eq} = R_{E(H)}$ |
| C | 432c / $R_{E(H)}$ 431c | a) $R_{on,eq} = R_{E(H)}$<br>b) $R_{off,eq} = 0$ |
| D | $R_s$ 433d, 432d, $R_{E(H)}$ 431d | a) $R_{on,eq} = R_{E(H)} // R_s$<br>b) $R_{off,eq} = R_{E(H)}$ |
| E | $R_s$ 433e, 432e, $R_{E(H)}$ 431e | a) $R_{on,eq} = R_{E(H)}$<br>b) $R_{off,eq} = R_{E(H)} // R_s$ |

1710a 1720a 1730a 1740a 1750a 1710b 1720b 1730b 1740b 1750b 1810a 1820a 1830a 1840a 1850a 1810b 1820b 1830b 1840b 1850b

INVERTER CIRCUIT HAVING SWITCHING DEVICE WITH GATE DRIVEN BY HIGH-VOLTAGE INTEGRATED CIRCUIT

CROSS REFERENCE TO RELATED APPLICATION

This application claims the priority to Korean Patent Application No. 2003-18304, filed on Mar. 24, 2003, in the Korean Intellectual Property Office, the disclosure of which is incorporated herein by reference in its entirety.

BACKGROUND OF THE INVENTION

1. Field of the Invention

The present invention relates to an inverter circuit, and more specifically, an inverter circuit with a switching device, in which a gate is driven by a high-voltage integrated circuit.

2. Description of the Related Art

With the broader use of low-power Insulated Gate Bipolar Transistor (IGBT) inverters of about 3.7 Kw or lower even in household appliances, more attention is being given to providing high efficiency and low electro-magnetic interference (EMI) noise and minimizing the cost, the size, and the weight of the inverters. Also, a high-voltage integrated circuit (HVIC) for a high-voltage gate driver is increasingly being used with the IGBT inverters. The HVIC enables not only reliable control of pulse width modulation (PWM) but also simplifies circuit construction and reduces costs.

However, a gate driver implemented as an HVIC may generate latched gate output signals, which potentially could destroy the entire system. This is because a reference voltage, which is applied to the HVIC used for driving a gate, is floated and fluctuates at every moment an IGBT is switched. Such a latch phenomenon may occur due to an inverter power circuit and its parameters, a gate driving circuit and its parameters, the switching characteristics of the IGBT, the operating conditions of an inverter, and the like.

FIG. 1 is a schematic diagram of a conventional, previously developed inverter circuit. FIG. 2 is a timing diagram showing an input signal and output signals of an HVIC at the inverter circuit of FIG. 1, wherein the output signals are generated when latch-on and latch-up occur, respectively.

Referring to FIG. 1, an output terminal O of an HVIC 110 is connected to a gate terminal of an IGBT 130, which is a switching device, through a gate series resistor $R_g$. A gate control signal $V_g$ is output through the output terminal O of the HVIC 110. A capacitor 170, which generates an input DC-link voltage $V_{DC}$, is connected to a collector terminal of the IGBT 130 through a switch $S_1$ 172. Also, an inductive load $L_{load}$ 164 is connected to a node D, which is connected to an emitter terminal of the IGBT 130. A stray inductor 161 having an inductance $L_{stray}$, a diode 162, and a shunt resistor 163 having a resistance $R_{shunt}$ are connected in series to the node D. The node D is also connected to a node S, which is both an output terminal of the HVIC 110 and a terminal of a bootstrap circuit.

The HVIC 110 includes two input terminals IN and C. The HVIC 110 receives a control input signal $V_{in}$ from a controller 120 through the input terminal IN and receives an integrated circuit driving voltage $V_{CC}$ through the input terminal C. A level-shift MOS transistor 155, which is located inside the HVIC 110, transmits to an edge triggering block 111 the control input signal $V_{in}$, which is input from the input terminal IN, through a switching operation. The edge triggering block 111 senses a falling edge of the received control input signal $V_{in}$ and maintains the control input signal IN until the next signal is input. The signal maintained by the edge triggering block 111 is input to the gate terminal of the IGBT 130 through a buffer 112 and the gate output terminal O.

The HVIC 110 is connected to the bootstrap circuit, which includes a capacitor 151, a bootstrap resistor 152, a bootstrap diode 153, and a bootstrap capacitor 154, which are connected in series. The capacitor 151 transmits energy to a secondary power source of the HVIC 110, i.e., the bootstrap capacitor 154. The bootstrap resistor 152 prevents rapid charging of the bootstrap capacitor 154. The bootstrap diode 153 protects the HVIC 110 and low-voltage devices from high voltage when the IGBT 130 is switched off. The bootstrap capacitor 154 functions as the secondary power source of the HVIC 110 and is connected to terminals B and S of the HVIC 110.

In the foregoing conventional inverter circuit, if a latch phenomenon occurs in the IGBT 130, the gate control signal $V_g$ output from the output terminal O of the HVIC 110 is not affected by the control input signal $V_{in}$ output from the controller 120. Thus, the IGBT 130 does not perform appropriate switching operations. That is, even if the HVIC 110 receives the control input signal $V_{in}$ from the controller 120 as shown in (a) of FIG. 2, at time t6 where latch-on occurs, the gate control signal $V_g$ output from the output terminal O of the HVIC 110 is not held in an off-signal state and abnormally generates an on-signal, as shown in (b) of FIG. 2. Also, at time t4 where latch-up occurs, the gate control signal Vg output from the output terminal O of the HVIC 110 is held in an off-signal state without generating an on-signal, as shown in (c) of FIG. 2. Therefore, the IGBT 130 is abnormally switched on at time t6 even though it should be switched off when the latch-on occurs, and is abnormally switched off at time t4 even though it should be switched on when the latch-up occurs.

FIGS. 3A and 3B are signal diagrams showing an input signal waveform of an HVIC and a collector current of an IGBT when latch-up and latch-on occur, respectively.

Referring to FIG. 3A, even if a control input signal Vin corresponding to switching-on data is input to an HVIC 110 at time t4, the collector current IC of an IGBT 130 does not increase. As is known, such latch-up occurs because a very high steady-state reverse voltage is generated at terminal S of the HVIC 110 due to a voltage drop caused by freewheeling current IFW flowing through diode 162 and a shunt resistor 163 between times t3 and t4.

Referring to FIG. 3B, even if a control input signal Vin corresponding to switching-off data is input to the HVIC 110 at time t6, the collector current IC of the IGBT 130 decreases instantly and thereafter starts increasing again. As is known, such latch-on occurs due to forward conduction of parasitic diodes inside the HVIC 110 in an over-stress condition, such as no-load or rapid charging of the bootstrap capacitor 154. In the over-stress condition, current flows through an internal Electro Static Discharge (ESD) diode located between two terminals B and S of the HVIC 110, and the high-side IGBT 130 is turned on due to the current.

Therefore, latch-on or latch-up may prevent steady switching operations of an inverter circuit, in which an IGBT 130 is switched by an HVIC 110, thus potentially destroying elements of the inverter device.

SUMMARY OF THE INVENTION

The present invention, in one embodiment, provides an inverter circuit having a switching device with a gate driven by a high-voltage integrated circuit (HVIC), the inverter circuit being capable of preventing latch-on and latch-up.

In accordance with an aspect of the present invention, there is provided an inverter circuit comprising a switching device which performs a switching operation corresponding to a gate control signal input to a gate terminal, converts an input DC to an alternating current (AC), and outputs the AC; an HVIC which inputs the gate control signal to the gate terminal of the switching device; a controller which inputs to the HVIC a control signal for enabling the HVIC to generate the gate control signal; a bootstrap circuit which transmits energy to a high-side region of the HVIC; and an impedance cell which is located between the HVIC and one terminal of the switching device to reduce voltage drop of the high-side HVIC.

The switching device is preferably an insulated gate bipolar transistor (IGBT). A collector terminal of the IGBT is connected to a DC input power source, and an emitter terminal thereof is connected to an output terminal.

Herein, the impedance cell is preferably located between the HVIC and the emitter terminal of the IGBT.

Preferably, the bootstrap circuit includes a power source; a bootstrap resistor connected in series to the power source; a bootstrap diode having an anode terminal connected in series to the bootstrap resistor and having a cathode terminal located in the opposite direction of the bootstrap resistor; and a bootstrap capacitor which is connected to both the cathode terminal of the bootstrap diode and a node that is commonly connected to the HVIC and the impedance cell.

Preferably, the impedance cell includes a resistor.

The impedance cell may include a resistor and a diode, which are connected in parallel to each other.

Herein, the diode may be located such that an anode terminal of the diode is connected to the switching device and a cathode terminal thereof is connected to the HVIC or such that the anode terminal of the diode is connected to the HVIC and the cathode terminal thereof is connected to the switching device.

The impedance cell may include a first resistor, a second resistor that is connected to the first resistor in parallel, and a diode connected to the first resistor in parallel and to the second resistor in series.

Herein, the diode may be located such that an anode terminal of the diode is connected to the switching device and a cathode terminal thereof is connected to the HVIC through the second resistor or such that the anode terminal of the diode is connected to the HVIC through the second resistor and the cathode terminal thereof is connected to the switching device.

Important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which:

FIG. 5 is a table showing various exemplary implementations of an impedance cell shown in FIG. 4 and their equivalent resistances;

DETAILED DESCRIPTION OF THE INVENTION

The present invention will now be described more fully with reference to the accompanying drawings, in which preferred embodiments of the invention are shown. This invention may, however, be embodied in many different forms and should not be construed as being limited to the embodiments set forth herein.

Figure 4:
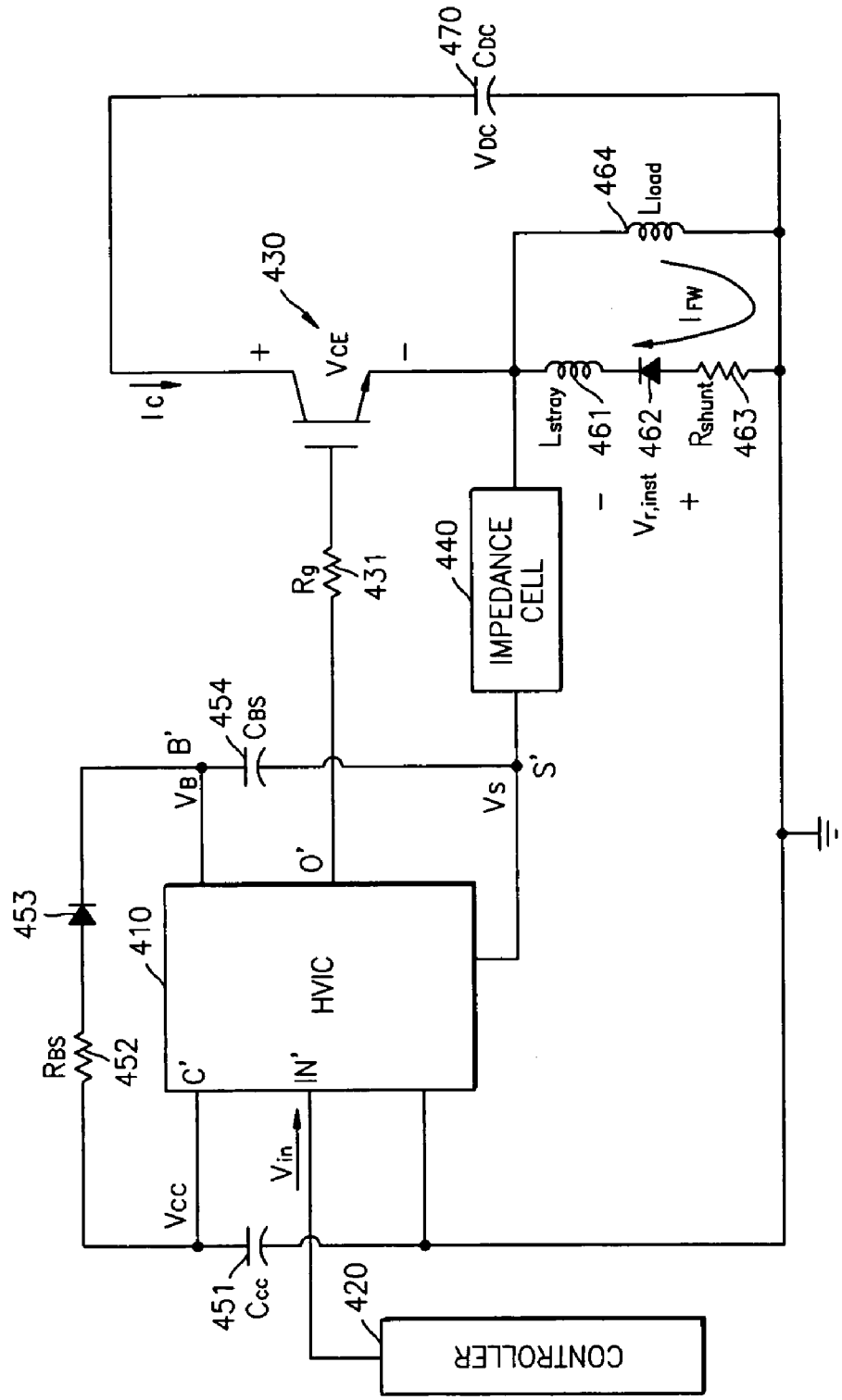
FIG. 4 is a schematic diagram of an inverter circuit according to an embodiment of the present invention.

FIG. 4 is a schematic diagram of an inverter circuit according to an embodiment the present invention, and FIG. 5 is a table showing various exemplary implementations of an impedance cell shown in FIG. 4 and their equivalent resistances.

Referring to FIG. 4, an output terminal O' of an HVIC 410 is connected to a gate terminal of an IGBT 430, which is a switching device, through a gate series resistor 431. A capacitor 470 for generating an input DC-link voltage VDC is connected to a collector terminal of the IGBT 430. An inductive load 464 is connected to an emitter terminal of the IGBT 430. The emitter terminal of the IGBT 430 is connected in series to a stray inductor 461, a diode 462, and a shunt resistor 463, which are connected in parallel to the inductive load 464. Also, the emitter terminal of the IGBT 430 is connected to the HVIC 410 and a bootstrap circuit (comprising capacitor 451, resistor 452, diode 453, and capacitor 454) through an impedance cell 440.

The HVIC 410 includes two input terminals IN' and C'. The HVIC 110 receives a control input signal $V_{in}$ from a controller 420 through the input terminal IN' and receives an integrated circuit driving voltage $V_{CC}$ through the input terminal C'. Although not shown in the drawings, HVIC 410 may comprise a level-shift MOS transistor, an edge triggering block, and a buffer. The level-shift MOS transistor transmits to the edge triggering block the control input signal $V_{in}$, which is input from the input terminal IN' through a switching operation. The edge triggering block senses a falling edge of the received input control signal $V_{in}$ and maintains the input control signal $V_{in}$ until the next signal is input. The signal maintained by the edge triggering block is input to the gate terminal of the IGBT 430 through the buffer and the gate output terminal O'.

The HVIC 410 is connected to the bootstrap circuit, which includes a capacitor 451, the bootstrap resistor 452, the bootstrap diode 453, and the bootstrap capacitor 454, connected in series. As described above, the capacitor 451 transmits energy to a secondary power source of the HVIC 410, i.e., the bootstrap capacitor 454. The bootstrap resistor 452 prevents rapid charging of the bootstrap capacitor 454. The bootstrap diode 453 protects the HVIC 410 and low-voltage devices from high voltage when the IGBT 430 is switched off. The bootstrap capacitor 454 functions as the secondary power source of the HVIC 410 and is connected to terminals B' and S' of the HVIC 410.

The impedance cell 440, which is connected between the emitter terminal of the IGBT 430 and the output terminal S' of the HVIC 410, generally functions to suppress latch-up and latch-on in the HVIC 410. Here, the terminal S' of the HVIC 410 can be both a high-voltage floating ground terminal and a secondary ground terminal floated at a ground terminal of a primary input signal. The impedance cell 440 may include one or more resistors and diode.

FIG. 5 shows various exemplary implementations for the impedance cell 440. An Type A impedance cell 440 (hereinafter, type A) includes a resistor 431a having resistance $R_{E(H)}$. A Type B impedance cell 440 (hereinafter, type B) includes a resistor 431b having resistance $R_{E(H)}$ and a diode 432b, which are connected in parallel. In type B, an anode terminal of the diode 432b is situated to connect to an emitter terminal of an IGBT 430, and a cathode terminal thereof is an HVIC 410. Like in type B, a Type C impedance cell 440 (hereinafter, type C) includes a resistor 431c having resistance $R_{E(H)}$ and a diode 432c, which are connected in parallel. However, unlike in type B, an anode terminal of the diode 432c is situated to connect to an HVIC 410, and a cathode terminal thereof is situated to connect to an emitter terminal of an IGBT 430. In a Type D impedance cell 440 (hereinafter, type D), a diode 432d and a resistor 433d having resistance Rs are connected in series. The diode 432d and the resistor 433d are connected in parallel to a resistor 431d having resistance $R_{E(H)}$. In type D, an anode terminal of the diode 432d is situated to connect to an emitter terminal of an IGBT 430, and a cathode terminal thereof connects to the resistor 433d. Like in type D, an E-type impedance cell 440 (hereinafter type E) includes a diode 432e and a resistor 433e having resistance Rs, which are connected in a series. The diode 432e and the resistor 433e are connected in parallel to the resistor 431e having resistance $R_{E(H)}$. However, an anode terminal of the diode 432e connects to the resistor 433e, and a cathode terminal thereof situated to connect to an emitter terminal of an IGBT 430.

When an IGBT 430 is switched on and off, the equivalent resistances of the foregoing various impedance cells 440 are as follows. In type A, switching-on equivalent resistance Ron,eq is the resistance $R_{E(H)}$ of the resistor 431a and equal to switching-off equivalent resistance Roff,eq. In type B, the switching-on equivalent resistance Ron,eq is 0, while switching-off equivalent resistance Roff,eq is the resistance $R_{E(H)}$ of the resistor 431b. In type C, switching-on equivalent resistance Ron,eq is the resistance RE(H) of the resistor 431c, while switching-off equivalent resistance Roff,eq is 0. In type D, switching-on equivalent resistance Ron,eq is the sum of the resistances of the resistor 431d and the resistor 433d, which are connected in parallel, i.e., resistance $R_{E(H)}$//Rs. Switching-off equivalent resistance Roff,eq is the resistance $R_{E(H)}$ of the resistor 431d. In type E, switching-on equivalent resistance Ron,eq is the resistance $R_{E(H)}$ of the resistor 431e, and switching-off equivalent resistance Roff,eq is the sum of the resistances of the resistor 431e and the resistor 433e, which are connected in parallel, i.e., the resistance $R_{E(H)}$//Rs.

The following Table 1 shows the various characteristics of the impedance cells 440.

TABLE 1

| | Characteristics | | |
|---|---|---|---|
| Type | On dv/dt control | Off dv/dt control | Control of latch occurrence |
| A | Δ | Δ | Δ |
| B | X | ○ | ○ |
| C | ○ | X | X |
| D | ○ | ○ | ○ |
| E | ○ | ○ | ○ |

Here, ○ denotes the most optimal characteristic, X denotes the least optimal characteristic, and Δ denotes an intermediate characteristic.

As shown in Table 1, various impedance cells 440 have different characteristics. Thus, the type of impedance cell 440 can be selected depending on system requirements. For example, type B and type C have only one of the equivalent resistances $R_{on,eq}$ and $R_{off,eq}$ and thus can be selected according to switching operations. By contrast, type A, type D, and type E have both the switching-on equivalent resistance $R_{on,eq}$ and switching-off equivalent resistance $R_{off,eq}$. Among them, type A has the simplest construction and thus can be selected when it is expected that there will be limited use of a target system. However, since resistance is the only design parameter, type A may not have optimum characteristics. Since type D and type E have independent resistances unlike type A, they may provide improved switching-on and switching-off characteristics.

In comparison to latch-up, latch-on is a more severe and difficult problem because it is related to voltage drop in the stray inductor 461 and the current falling time at turn-off. The latch-up problem can be managed in the circuit design by considering maximum current level, shunt resistor value, and diode voltage drop at steady-state condition. For this reason, a mechanism where the latch-on is controlled by the impedance cell 440 will be chiefly described hereinafter. Nevertheless, the impedance cell 440 of the present invention can also be used for preventing the latch-up problem because the circuit basically has an effect on reducing the reverse voltage.

Figure 6:
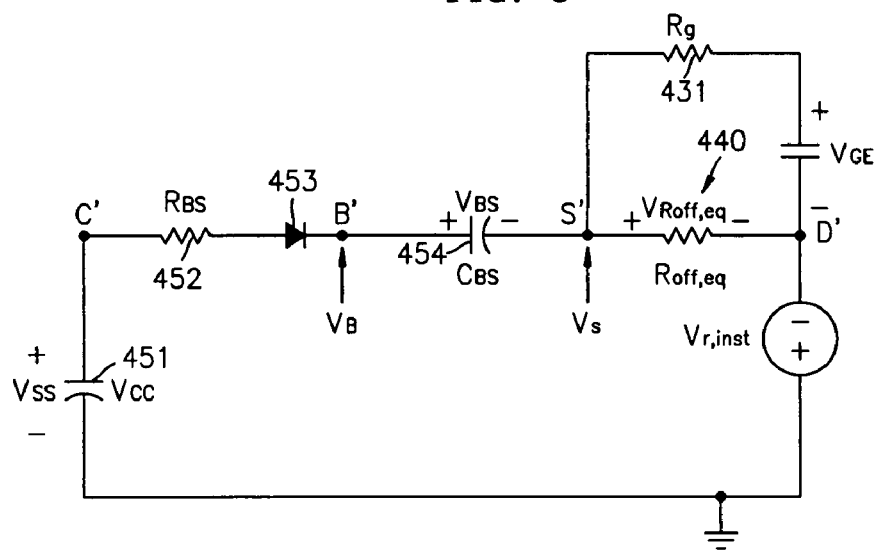
FIG. 6 is an equivalent circuit schematic diagram when an IGBT is turned off in the inverter circuit shown in FIG. 4.
Figure 7:
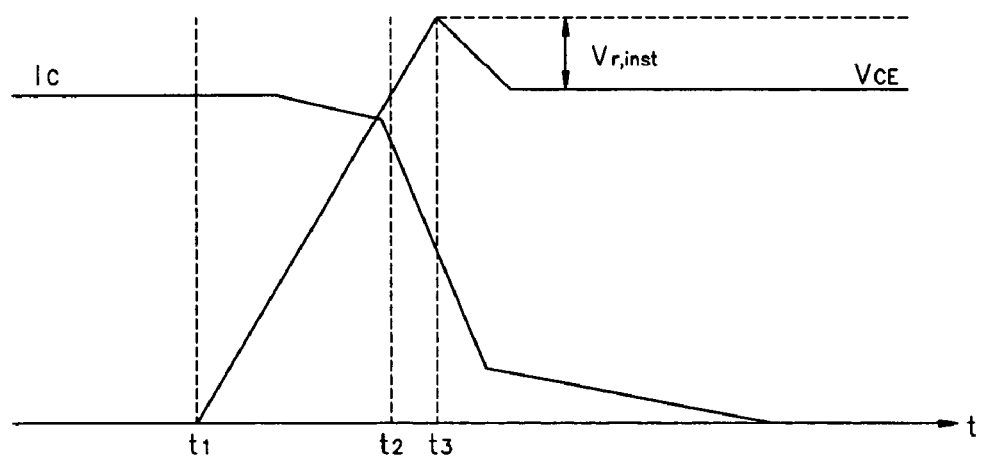
FIG. 7 is a diagram showing turn-off switching signal waveforms in the equivalent circuit shown in FIG. 6.

FIG. 6 is an equivalent circuit schematic diagram when an IGBT is turned off in the inverter circuit shown in FIG. 4, and FIG. 7 is a diagram showing turn-off switching signal waveforms in the equivalent circuit shown in FIG. 6.

To begin, as shown in FIG. 6, when the IGBT 430 is turned off, a gate series resistor 431 and the impedance cell 440 having turn-off equivalent resistance are connected in parallel between a node S' connected to the HVIC 410 and a node D', and, as shown in FIG. 4, a terminal voltage $V_{GE}$ between a gate and an emitter of the IGBT 430 is connected as a voltage source between the gate series resistor 431 and the impedance cell 440. In this equivalent circuit diagram, a terminal voltage at a node B' is expressed as shown in Equation (1).

$$V_B = V_{RE(H)} + V_{BS} - V_{r,inst} \qquad (1)$$

Here, $V_{RE(H)}$ is a voltage drop in the impedance cell 440.

The instantaneous voltage $V_{r,inst}$ is the sum of voltages applied to both terminals of a stray inductor 461, a diode 462, and, a shunt resistor 463 and is expressed as shown in Equation (2).

$$V_{r,inst} = V_{R,shunt} + V_{D2} + V_{stray} = I_{FW} R_{shunt} + V_{D2} + L_{stray} \frac{dI_{FW}}{dt} \qquad (2)$$

Here, $V_{R,shunt}$ is a voltage applied to both terminals of the shunt resistor 463, $V_{D2}$ is a voltage applied to both terminals of the diode 462, and $V_{stray}$ is a voltage applied to both terminals of the stray inductor 461. Thus, turn-off equivalent voltage drop $V_{Roff,eq}$ is expressed as shown in Equation (3).

$$V_{Roff,eq} = \frac{R_g // R_{off,eq}}{R_{BS} + R_g // R_{off,eq}} \times V_{r,inst} + \frac{R_{off,eq}}{R_g + R_{off,eq}} \times VGE \qquad (3)$$

When the high-side IGBT 430 is turned off, the instantaneous voltage $V_{r,inst}$ shown in Equation (2) is induced by freewheeling current IFW through the diode 462, thereby causing the voltage drop at the node B'. That is, the voltage drop decreases by the amount of the turn-off equivalent voltage drop $V_{Roff,eq}$ shown in Equation (3). As shown in FIG. 7, Equations 2 and 3 are applied after the timing t2 because the bootstrap diode 453 and the diode 462 do not conduct and also the instantaneous voltage $V_{r,inst}$ is 0 between time t1 and t2. The turn-off equivalent resistance $R_{off,eq}$ is experimentally selected to the minimum value of equivalent impedance which does not cause the latch-on problem.

The equivalent resistor can be designed for controlling the turn-on switching can control dv/dt. When the voltage of the high-side IGBT 430 is decreased at turn-on, the parasitic capacitance of the HVIC 410 is charged through the equivalent resistance at the same time. The increased equivalent resistance compared to the conventional inverter circuit makes the transition slow and allows the dv/dt to be controlled. Because the HVIC 410 inherently has limited dv/dt rating at the node S', the controllability of dv/dt also provides more safe operation of the HVIC 410.

Figure 8:
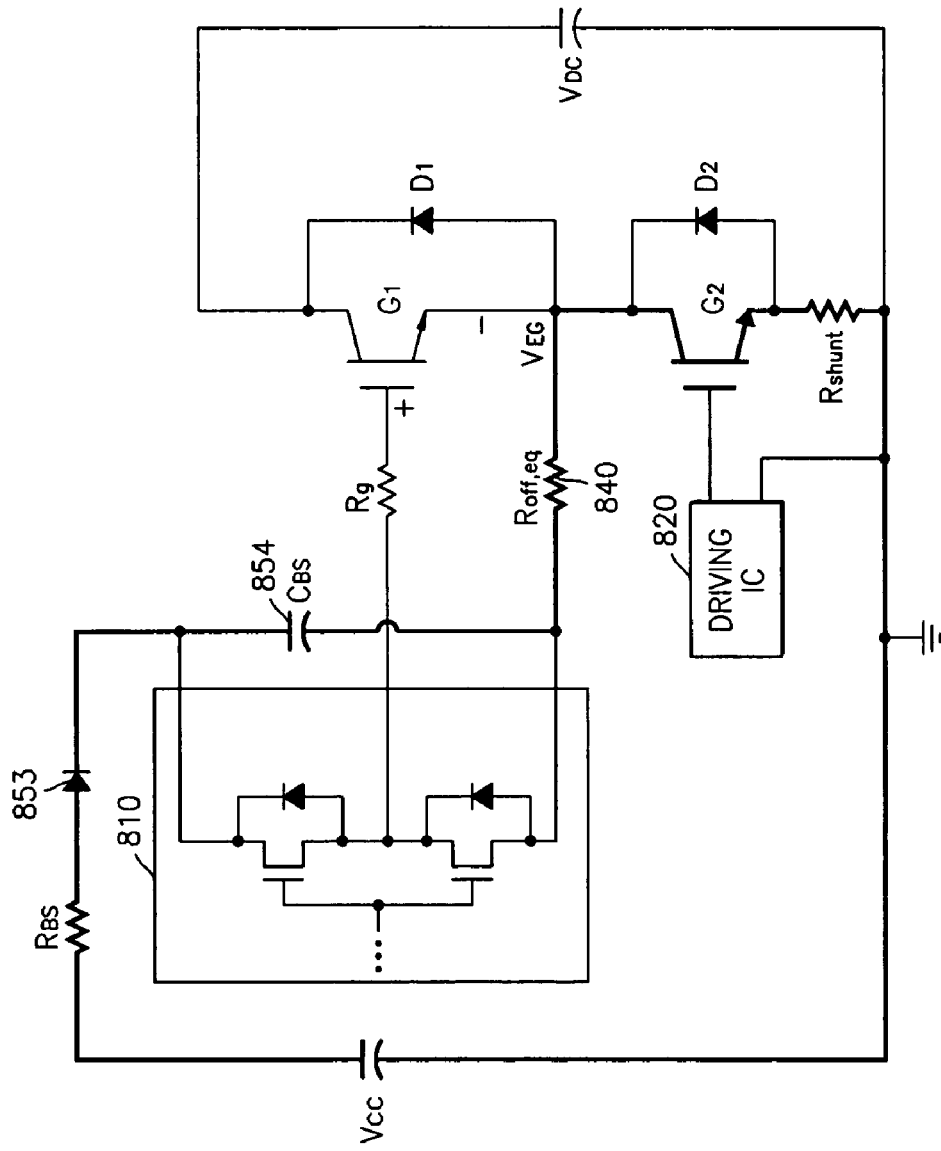
FIG. 8 is a schematic diagram showing an initial charging operation of the inverter circuit shown in FIG. 4.

FIG. 8 is a schematic diagram showing an initial charging operation of the inverter circuit shown in FIG. 4.

As shown in FIG. 8, the high-side IGBT G1 is connected to other elements like in the inverter circuit shown in FIG. 4. Thus, a gate of the high-side IGBT G1 is controlled by the HVIC 810. This circuit of FIG. 8 also includes a low-side IGBT G2. The gate of the low-side IGBT G2, is connected to and controlled by a driving IC 820. An impedance cell 840 having turn-off equivalent resistance $R_{off,eq}$ affects an initial charging mode of a bootstrap circuit. As illustrated with a bold line in the schematic, this is because when the low-side IGBT G2 is turned on, a bootstrap capacitor 854 is charged through the impedance cell 840 having the turn-off equivalent resistance $R_{off,eq}$. In this case, the gate-emitter voltage $V_{GE}$ and an initial charging condition of the IGBT G1 can be expressed as shown in Equations (4) and (5), respectively.

$$V_{GE} = \frac{R_{off,eq}}{R_{BS} + R_{off,eq}} (V_{CC} - V_{DBS} - V_{G2}) - V_{hvic,diode} \qquad (4)$$

$$V_{GE} < V_{Th,min} \qquad (5)$$

Here, $V_{DBS}$ is the forward voltage drop in the bootstrap diode 853, $V_{G2}$ is the forward voltage drop of the low-side IGBT G2, and $V_{hvic,diode}$ is the forward voltage drop in the internal buffer of the HVIC.

If the gate-emitter voltage $V_{GE}$ of the IGBT G1 reaches the threshold voltage level of the high-side IGBT G1, the IGBT G1 is turned on and shoot-through occurs even though it is a very short time. Accordingly, the gate-emitter voltage $V_{GE}$ of the high-side IGBT G1 may need to be limited to a smaller value than the minimum threshold voltage $V_{Th,min}$ of the IGBT G1.

Meanwhile, capacitance QBS of the bootstrap capacitor 854 can be obtained using Equations (6) and (7).

$$Q_{BS} \geq 2Q_g + \frac{I_{QBS,max}}{f_{sw}} + Q_{ls} + \frac{I_{CBS,lk}}{f_{sw}} \qquad (6)$$

$$C_{BS} \geq 15 \times \frac{2Q_{BS}}{\Delta V} \qquad (7)$$

Here, $Q_g$ is gate charge of the high-side IGBT, $I_{QBS,max}$ is the maximum quiescent current for the HVIC G1, $I_{CBS,1k}$ is the leakage current of the bootstrap capacitor 854, $Q_{1s}$ is level-shift charge required per cycle, and $\Delta V$ is the ripple voltage in the $V_{BS}$.

In the inverter circuit according to an embodiment of the present invention, power ratings of the components are varied depending on the type of the impedance cell (440 of FIG. 4). For example, in a cell of type B of FIG. 5, when the high-side IGBT 430 is turned on, the bootstrap capacitor 454 charges gate-emitter capacitance of the IGBT 430. Thus, as shown in the following Equation (8), power dissipation in the equivalent resistor when the IGBT 430 is turned on can be obtained from the maximum capacitor energy $C_{ge}$, which is divided by the gate series resistances $R_g$ and the resistances $R_g$ and $R_{E(H)}$ of the impedance cell 440.

$$P_{RE(H),on} = \frac{R_{E(H)} \times C_{ge}}{2(R_g + R_{E(H)})} V_{ge}^2 \times \left(1 - e^{-\frac{t}{R_t C_{ge}}}\right) \times f_{sw} \qquad (8)$$

Here, t is $3R_t C_{ge}$, $R_t$ is the sum of $R_g$ and $R_{E(H)}$, and $f_{sw}$ is switching frequency.

Meanwhile, when the high-side IGBT 430 is turned off, the discharging of the gate voltage of the IGBT 430 and the charging of the bootstrap capacitor 454 occur simultaneously. Thus, when the IGBT 430 is turned off, power dissipation $P_{RE(H),off}$ in the equivalent resistor of the impedance cell 440 and power dissipation $P_{RBS,off}$ in the bootstrap resistor 452 coupled with switching frequency can be expressed as shown in Equations (9) and (10), respectively.

$$P_{RE(H),off} = f_{sw} \times \int_0^{toff} \frac{V_{R_{E(H)}}^2}{R_{E(H)}} dt \qquad (9)$$

$$P_{RBS,off} = \frac{R_{BS}C_{BS}}{2(R_{BS}+R_{E(H)})}(\Delta V_{BS})^2 \times \left(1-e^{\frac{t}{R_T C_{BS}}}\right) \times f_{sw} \quad (10)$$

Here, t is $3R_T C_{BS}$, and $R_T$ is the sum of $R_{BS}$ and $R_{E(H)}$.

Accordingly, the total power dissipation in the equivalent resistor and bootstrap resistor can be expressed as shown in Equations (11) and (12), respectively.

$$P_{RE(H)} = P_{RE(H),on} + P_{RE(H),off} \quad (11)$$

$$P_{RBS} = P_{RBS,off} \quad (12)$$

Hereinafter, when an inverter circuit according to an embodiment of the present invention is used in practical applications, its various characteristics will be described with reference to graphs. In one example, the inverter circuit is used in an air conditioner, which generally requires high operating current in a condition where a switching frequency is low. In this inverter circuit, an impedance cell 440 is can be a Type B impedance cell of FIG. 5. However, even if other types of impedance cells of FIG. 5 are applied, similar results can be obtained. In this example, the following design parameters are used: input DC-link voltage $V_{DC}$ is 200–450 V, integrated circuit driving power source $V_{CC}$ is 13–18 V, maximum shut resistance $R_{shunt,max}$ is 6.8 mΩ, limited maximum load current is 30 A, and switching frequency $F_{SW}$ is 3 kHZ. Also, a low-speed type of the IGBT with the rating of 600V/10 A is used in the test.

Figure 1:
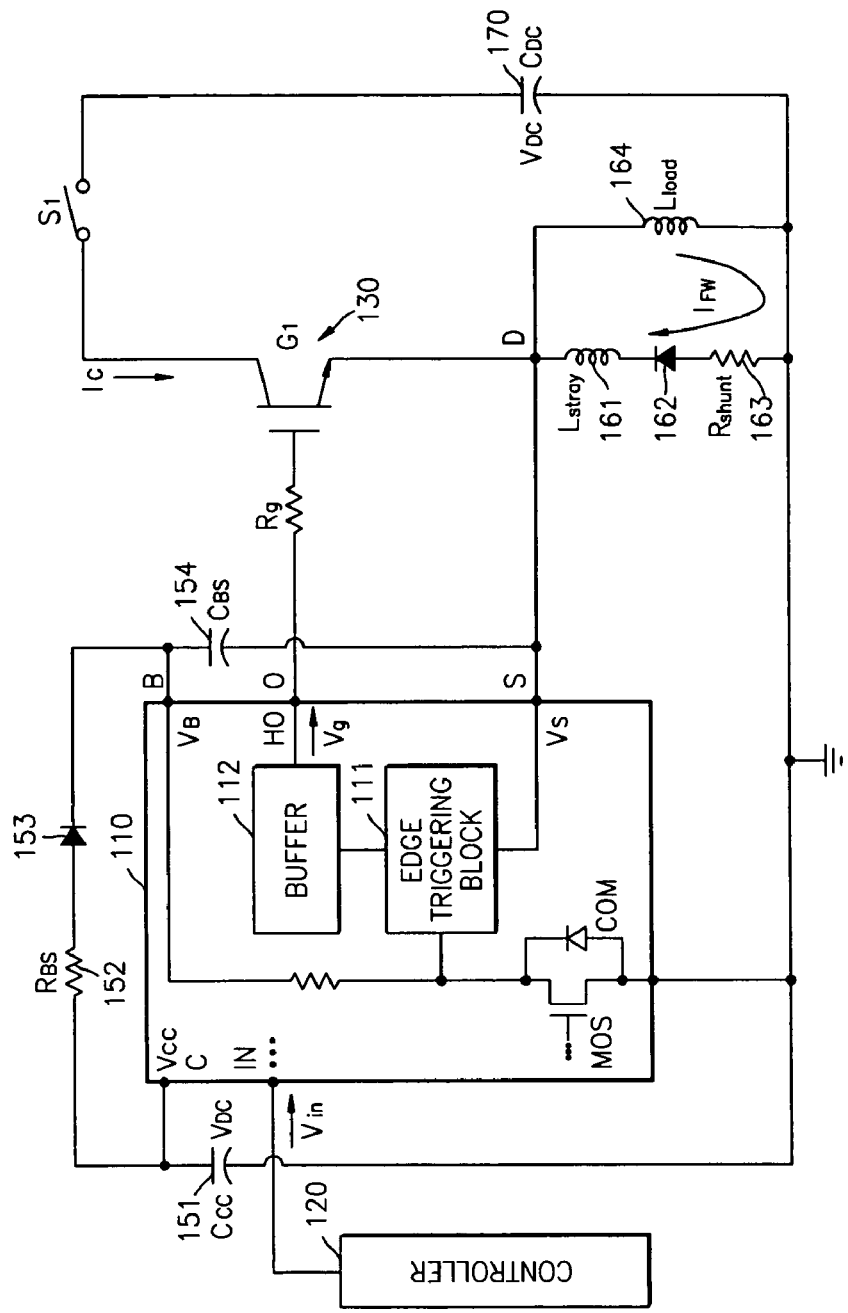
FIG. 1A is a schematic diagram of a conventional inverter circuit.
Figure 2:
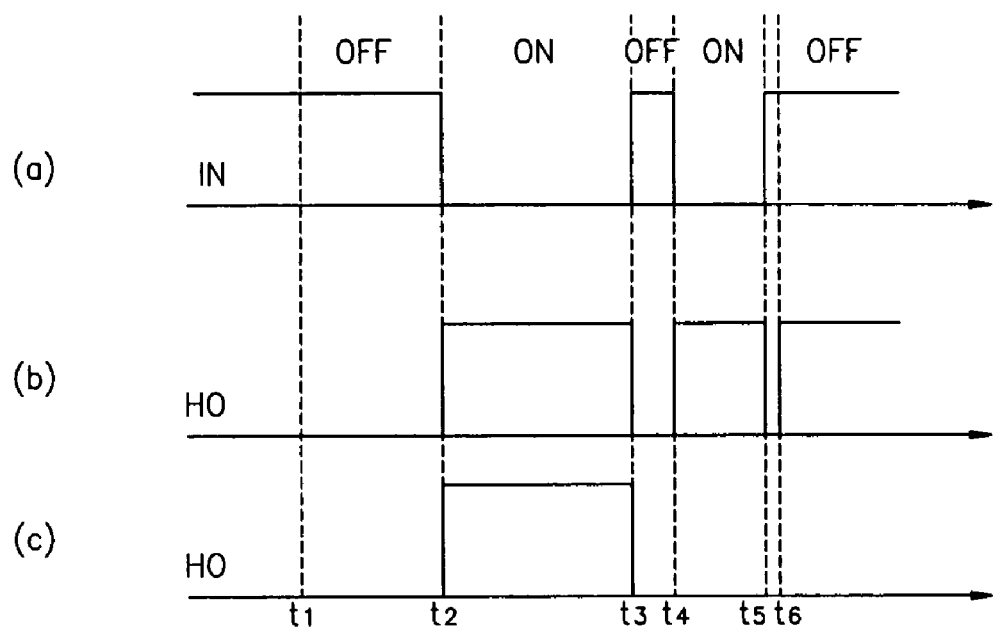
FIG. 2 is a timing diagram showing an input signal and output signals of an HVIC for the conventional inverter circuit, wherein the output signals are generated when latch-on and latch-up occur, respectively.
Figure 3A:
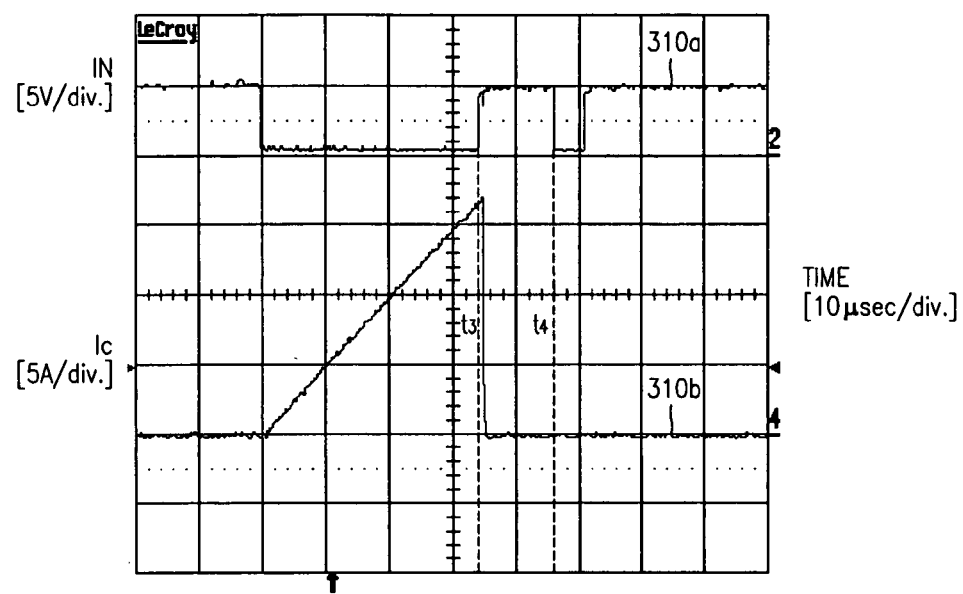
FIG. 3A is a signal diagram showing an input signal waveform of an HVIC and a collector current of an IGBT when latch-up occurs.
Figure 3B:
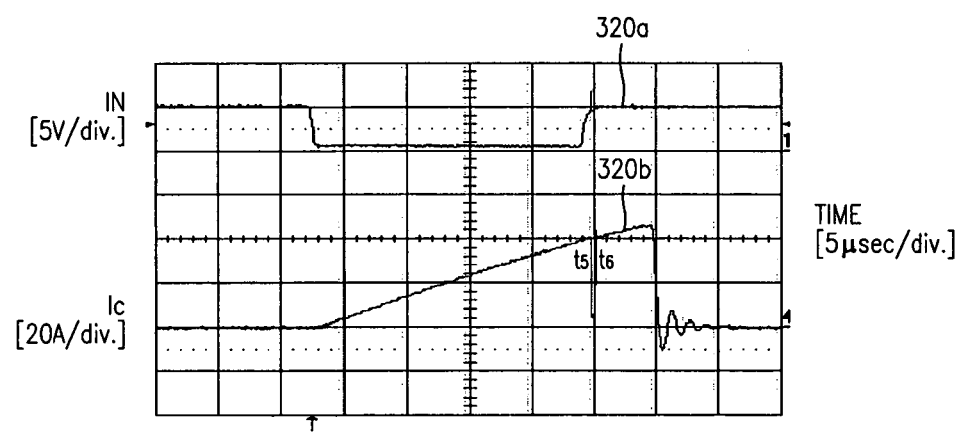
FIG. 3B is a signal diagram showing an input signal waveform of an HVIC and a collector current of an IGBT when latch-on occurs.
Figure 9A:
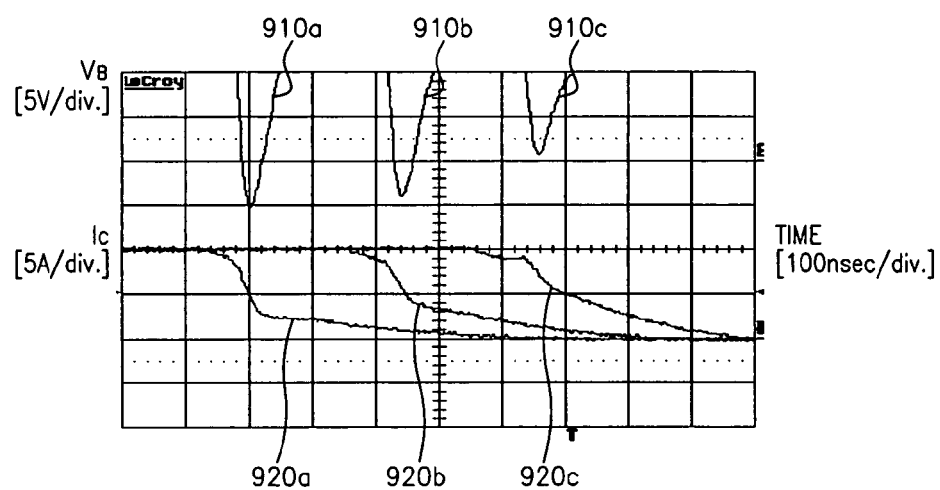
FIG. 9A is a signal diagram showing waveforms for measured terminal voltage of the HVIC and collector current of the IGBT at turn-off when there is variation in input capacitor voltage in the conventional inverter circuit shown in FIG. 1.
Figure 9B:
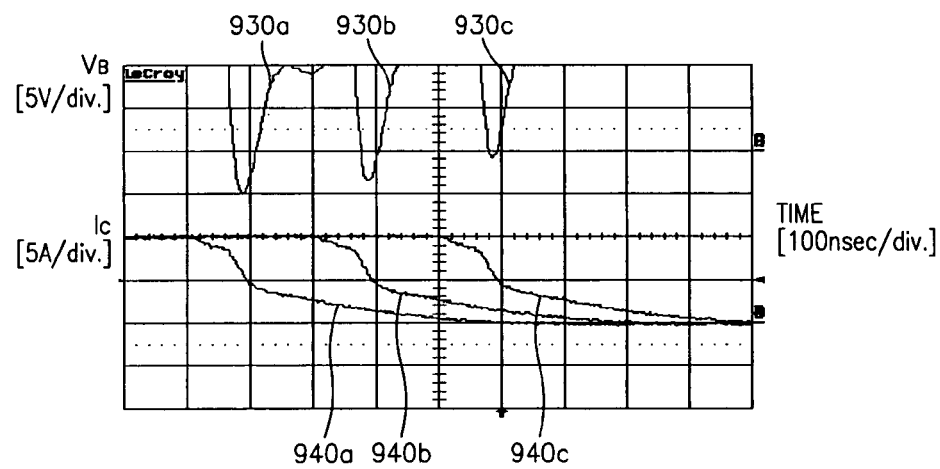
FIG. 9B is a signal diagram showing waveforms for measured terminal voltage of the HVIC and collector current of the IGBT at turn-off when there is variation in input bias voltage in the conventional inverter circuit shown in FIG. 1.
Figure 9C:
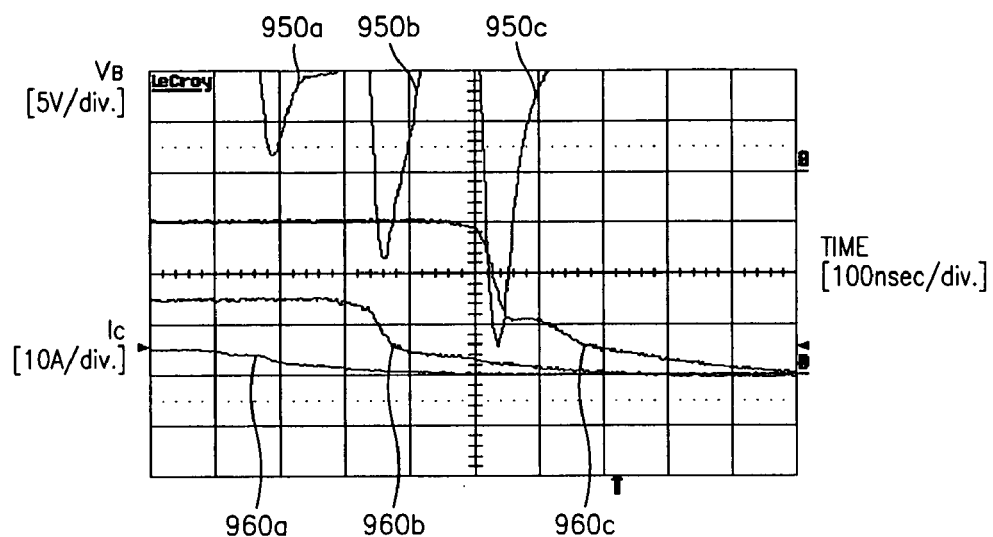
FIG. 9C is a signal diagram showing waveforms for measured terminal voltage of the HVIC and collector current of the IGBT at turn-off when there is variation in collector current in the conventional inverter circuit shown in FIG. 1.
Figure 9D:
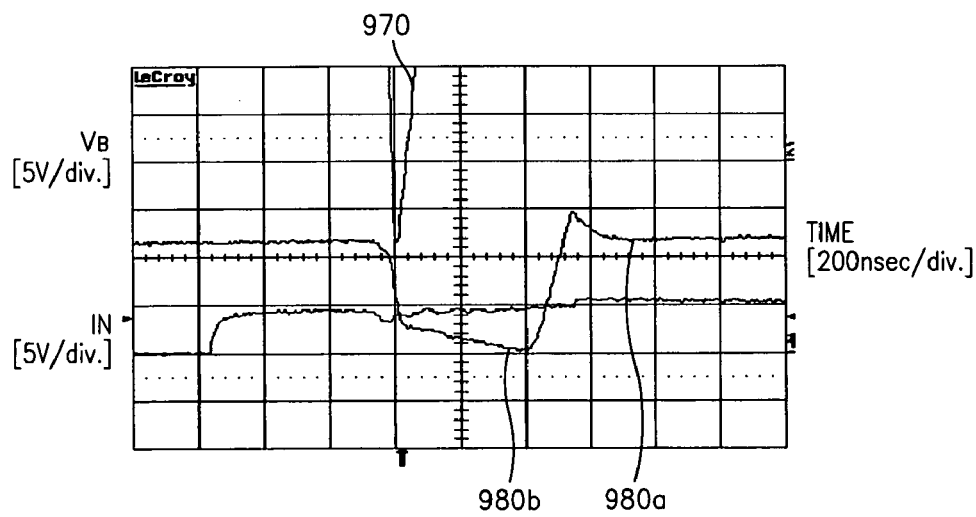
FIG. 9D is a signal diagram showing waveforms for maximum turn-off current, which does not cause latch-on, in the conventional inverter circuit shown in FIG. 1.

FIGS. 9A through 9C are signal diagrams showing waveforms for measured terminal voltage $V_B$ of an HVIC 110 and collector current $I_C$ of the IGBT 130 at turn-off when there are variations in system parameters $V_{DC}$, $V_{CC}$, and $I_C$ in the conventional inverter circuit shown in FIG. 1. Also, FIG. 9D is a waveform diagram showing a waveform for maximum turn-off current, which does not cause latch-on, in the conventional inverter circuit shown in FIG. 1.

In FIG. 9A, reference numerals 910a, 910b, and 910c denote the terminal voltage $V_B$ of the HVIC 110 when the DC-link voltage $V_{DC}$ is 200V, 300V, and 400V, respectively. Reference numerals 920a, 920b, 920c denote the collector current $I_C$ of the IGBT 130 when the DC-link voltage $V_{DC}$ is 200V, 300V, and 400V, respectively. As shown in FIG. 9A, when the DC-link voltage $V_{DC}$ is lowest, the terminal voltage a $V_B$ of the HVIC 110, i.e., voltage drop at a node B is lowest (910a) because of the fastest current falling time.

Next, in FIG. 9B, reference numerals 930a, 930b, and 930c denote the terminal voltages $V_B$ of the HVIC 110 when the integrated circuit driving power source $V_{CC}$ is 13V, 15V, and 18V, respectively. Reference numerals 940a, 940b, and 940c denote the collector current $I_C$ of the IGBT 130 when the integrated circuit driving power source $V_{CC}$ is 13V, 15V, and 18V, respectively. As shown in FIG. 9B, when the integrated circuit driving power source $V_{CC}$ is lowest (i.e., 13V), the terminal voltage $V_B$ of the HVIC 110 (i.e., voltage drop at a node B') is lowest (930a).

Next, in FIG. 9C, reference numerals 950a, 950b, and 950c denote the terminal voltage $V_B$ of the HVIC 110 when the turn-off collector current $I_C$ of the IGBT 130 is 5 A, 15 A, and 30 A, respectively. Reference numerals 960a, 960b, and 960c denote waveforms of the collector current $I_C$ of the IGBT 130 when the turn-off collector current $I_C$ of the IGBT 130 is 5 A, 15 A, and 30 A, respectively. As shown in FIG. 9C, latch-on occurs at the largest collector current $I_C$ of 30 A (960c) and the voltage drop of terminal voltage $V_B$ is getting larger (950c) as the current is increased due to the faster current falling.

Next, in FIG. 9D, reference character 970 denotes the terminal voltage $V_B$ of the HVIC 110 under the worst condition where the DC-link voltage $V_{DC}$ is 200 V and the integrated circuit driving power source $V_{CC}$ is 13 V. Reference character 980b denotes the collector current $I_C$ of the IGBT 130 under the worst condition where the DC-link voltage $V_{DC}$ is 200 V and the integrated circuit driving power source $V_{CC}$ is 13 V. As shown in FIG. 9D, the latch-on does not occur at a current level of 13 A, which is somewhat higher than the rated current of 10 A. At this time, the terminal voltage $V_B$ becomes about −8 V.

Figure 10A:
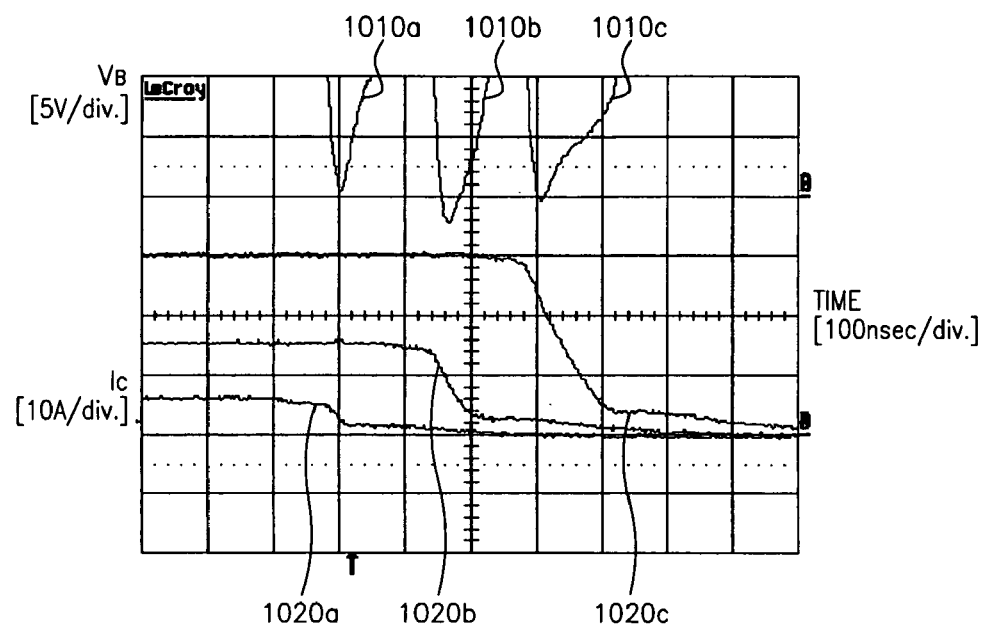
FIGS. 10A through 10C are signal diagrams showing waveforms for measured terminal voltage of the HVIC and collector current of the IGBT at turn-off when there is variation in resistance and collector current in an inverter circuit using a Type B impedance cell, shown in FIG. 5, according to an embodiment of the present invention.
Figure 10B:
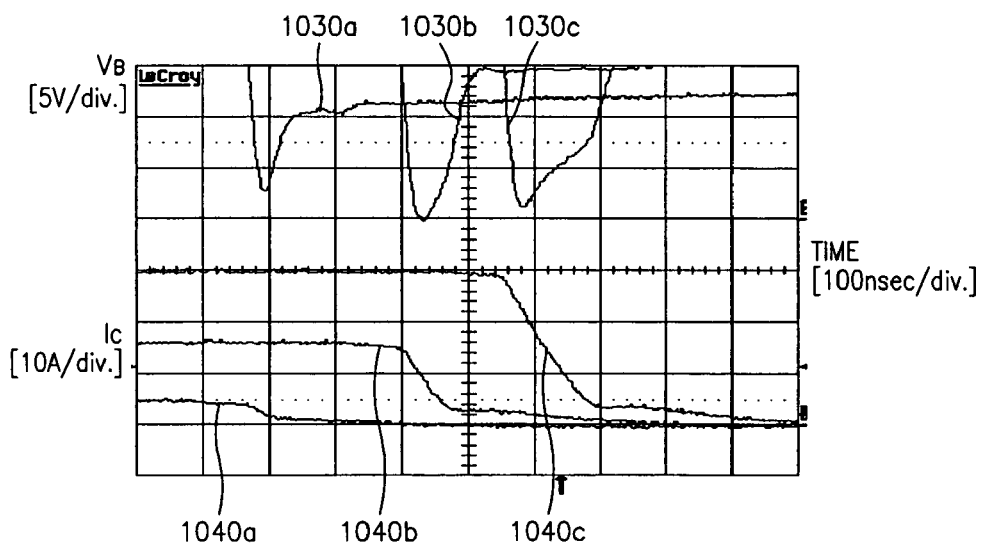
Figure 10C:
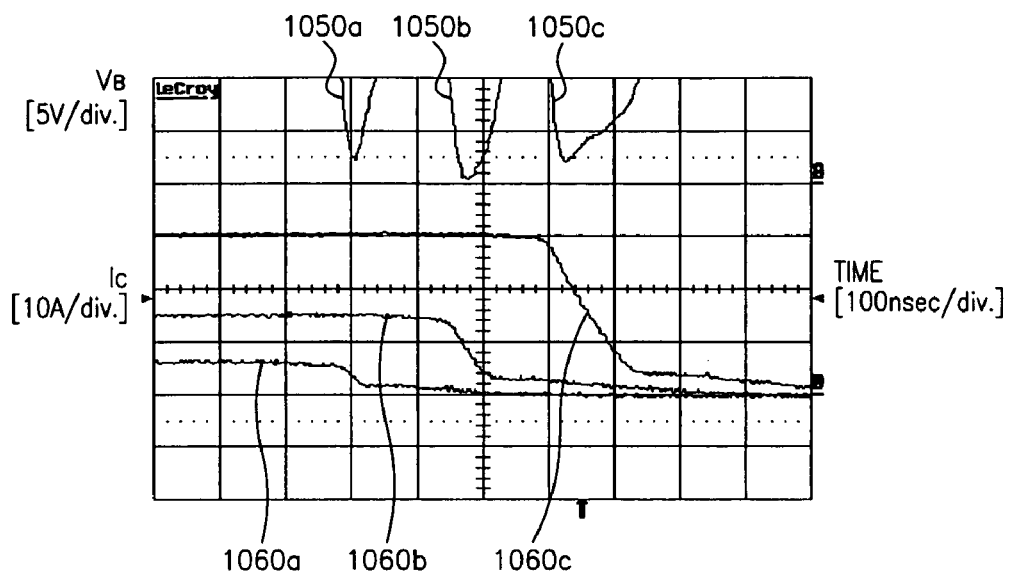

FIGS. 10A through 10C are signal diagrams showing waveforms for measured terminal voltage $V_B$ of an HVIC 410 and collector current $I_C$ of an IGBT 430 at turn-off when there is variation in the collector current $I_C$ in an inverter circuit using a Type B impedance cell, shown in FIG. 5, according to the present invention, in a state where the resistance $R_{BS}$ of a bootstrap resistor 452 and the equivalent resistance $R_{E(H)}$ of an impedance cell 440 differ.

In FIG. 10A, the resistance $R_{BS}$ of the bootstrap resistor 452 is 75 Ω and the equivalent resistance $R_{E(H)}$ of the impedance cell 440 is 30 Ω. Reference character 1010a, 1010b, and 1010c denote the terminal voltage $V_B$ of the HVIC 410 when the collector current $I_C$ of the IGBT 430 are 5 A, 15 A, and 30 A, respectively. Reference numerals 1020a, 1020b, and 1020c denote variation in the collector current $I_C$ of the IGBT 430 when the collector current $I_C$ of the IGBT 430 is 5 A, 15 A, and 30 A, respectively.

In FIG. 10B, the resistance $R_{BS}$ of the bootstrap resistor 452 is 100 Ω and the equivalent resistance $R_{E(H)}$ of the impedance cell 440 is 40 Ω. Reference numerals 1030a, 1030b, and 1030c denote the terminal voltage $V_B$ of the HVIC 410 when the collector current $I_C$ of the IGBT 430 is 5 A, 15 A, and 30 A, respectively. Reference numerals 1040a, 1040b, and 1040c denote variation in the collector current $I_C$ of the IGBT 430 when the collector current $I_C$ of the IGBT 430 is 5 A, 15 A, and 30 A, respectively.

In FIG. 10C, the resistance $R_{BS}$ of the bootstrap resistor 452 is 125 Ω and the equivalent resistance $R_{E(H)}$ of the impedance cell 440 is 51 Ω. Reference numerals 1050a, 1050b, and 1050c denote the terminal voltage $V_B$ of the HVIC 410 when the collector current $I_C$ of the IGBT 430 is 5 A, 15 A, and 30 A, respectively. Reference numerals 1060a, 1060b, and 1060c denote variation in the collector current $I_C$ of the IGBT 430 when the collector current $I_C$ of the IGBT 430 is 5 A, 15 A, and 30 A, respectively.

The three cases as shown in FIGS. 10A through 10C are in the worst condition where the DC-link voltage $V_{DC}$ is 200 V and the integrated circuit driving power source $V_{CC}$ is 13 V. As shown in FIGS. 10A through 10C, the latch-on does not occur in any of these cases. As the equivalent resistance $R_{E(H)}$ of the impedance cell 440 becomes higher, the negative level of the terminal voltage $V_B$ becomes smaller. In particular, unlike in the conventional inverter circuit, the terminal voltage $V_B$ has the minimum value in the current range of about 15 A. This is because larger blocking voltage across the equivalent resistance $R_{E(H)}$ corresponding to larger negative voltage affects the gate voltage and makes the turn-off falling time slower. As a result, it can be inferred that the equivalent resistance $R_{E(H)}$ of the impedance cell 440 may be selected to be 40 Ω because it always holds the terminal voltage $V_B$ positive.

Figure 11A:
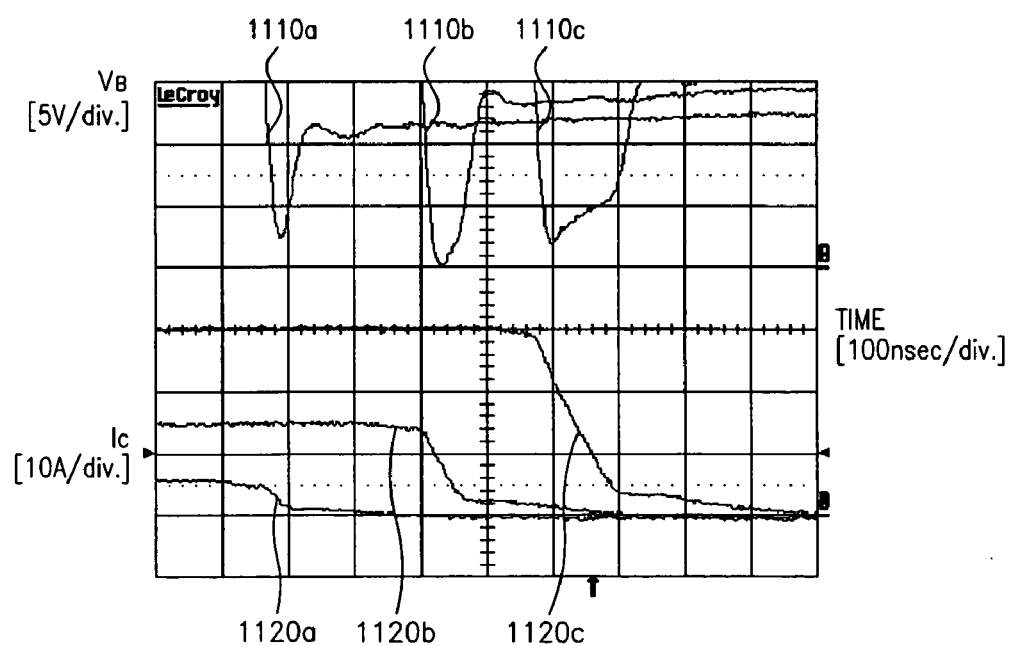
FIGS. 11A through 11C are signal diagrams showing waveforms for measured terminal voltage of the HVIC and collector current of the IGBT at turn-off when there is variation in operating condition and collector current in the inverter circuit of FIG. 4 according to an embodiment of the present invention.
Figure 11B:
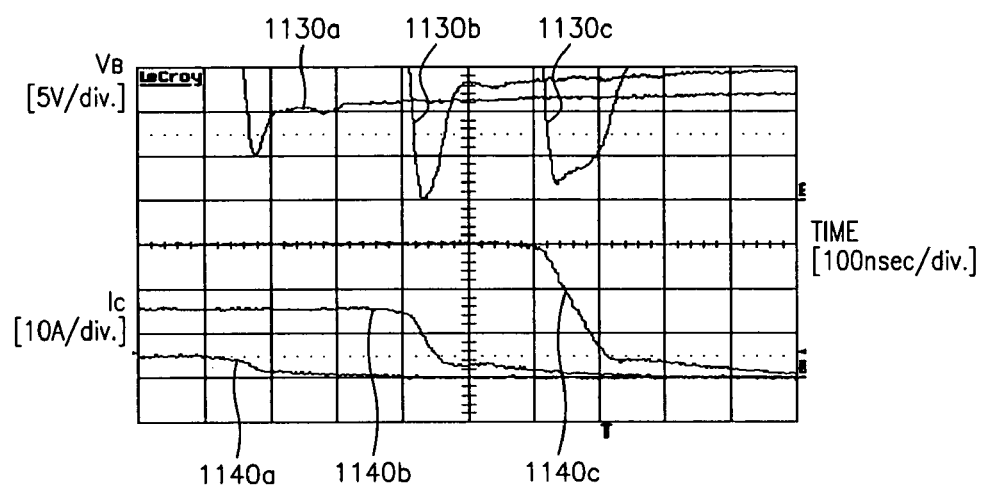
Figure 11C:
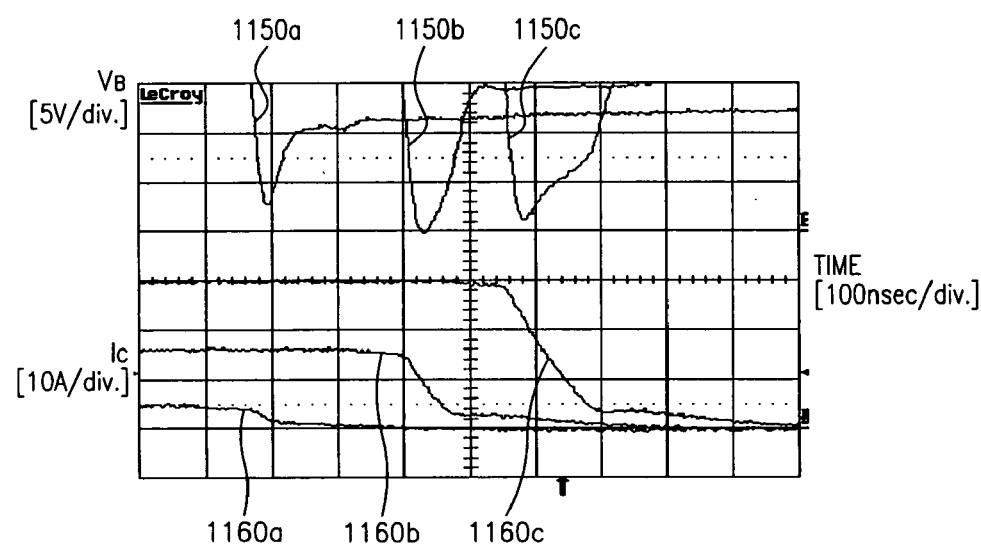

FIGS. 11A through 11C are signal diagrams showing waveforms for measured terminal voltage $V_B$ of an HVIC 410 and collector current $I_C$ of the IGBT 430 at turn-off when there are variations in operating condition and collector current $I_C$ in the inverter circuit of FIG. 4 according to embodiments of the present invention.

In FIG. 11A, operating temperature is −40° C. and the layout of a printed circuit board (PCB) is loose. Reference character 1110a, 1110b, and 1110c denote the terminal voltage $V_B$ of the HVIC 410 when the collector current $I_C$ of the IGBT 430 is 5 A, 15 A, and 30 A, respectively. Reference numerals 1120a, 1120b, and 1120c denote variation in collector current $I_C$ of the IGBT 430 when the collector current $I_C$ of the IGBT 430 is 5 A, 15 A, and 30 A, respectively.

In FIG. 11B, operating temperature is −40° C. and the layout of a printed circuit board is tight. Reference character 1130a, 1130b, and 1130c denote the terminal voltage $V_B$ of the HVIC 410 when the collector current $I_C$ of the IGBT 430 is 5 A, 15 A, and 30 A, respectively. Reference numerals 1140a, 1140b, and 1140c denote variation in collector current $I_C$ of the IGBT 430 when the collector current $I_C$ of the IGBT 430 is 5 A, 15 A, and 30 A, respectively.

In FIG. 11C, operating temperature is 25° C. and the layout of a printed circuit board is loose. Reference character 1150a, 1150b, and 1150c denote the terminal voltage $V_B$ of the HVIC 410 when the collector current $I_C$ of the IGBT 430 is 5 A, 15 A, and 30 A, respectively. Reference numerals 1160a, 1160b, and 1160c denote variation in collector current $I_C$ of the IGBT 430 when the collector current $I_C$ of the IGBT 430 is 5 A, 15 A, and 30 A, respectively.

In the three cases as shown in FIGS. 11A through 11C, the resistance $R_{BS}$ of the bootstrap resistor 452 is 75 Ω, the equivalent resistance $R_{E(H)}$ of the impedance cell 440 is 30 Ω, the DC-link voltage $V_{DC}$ is 200 V, and the integrated circuit driving power source $V_{CC}$ is 13 V. As shown in FIGS. 11A through 11C, although the transient times of the current failings become different by the variation of operating temperature and the PCB layout, the undershoot levels are not changed. In particular, in FIG. 11B where the PCB layout is very tight, current falling time is shorter compared to FIG. 11A where the PCB layout is looser.

Figure 12A:
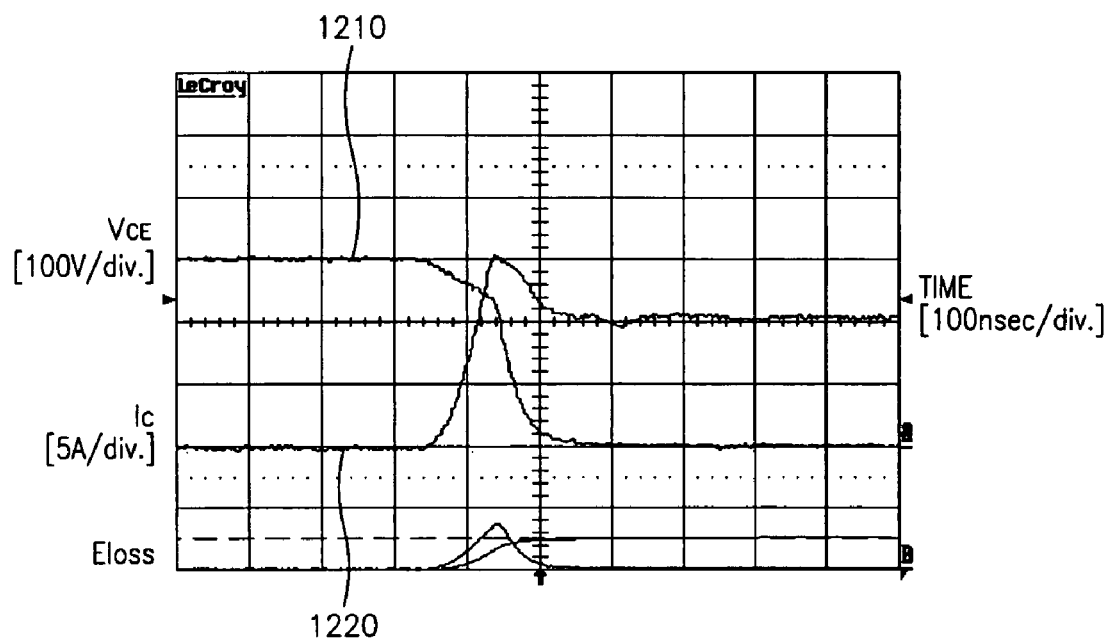
FIG. 12A is a signal diagram showing waveforms for measured collector-emitter voltage, collector current, and energy loss of the IGBT at turn-off in the conventional inverter circuit shown in FIG. 1.
Figure 12B:
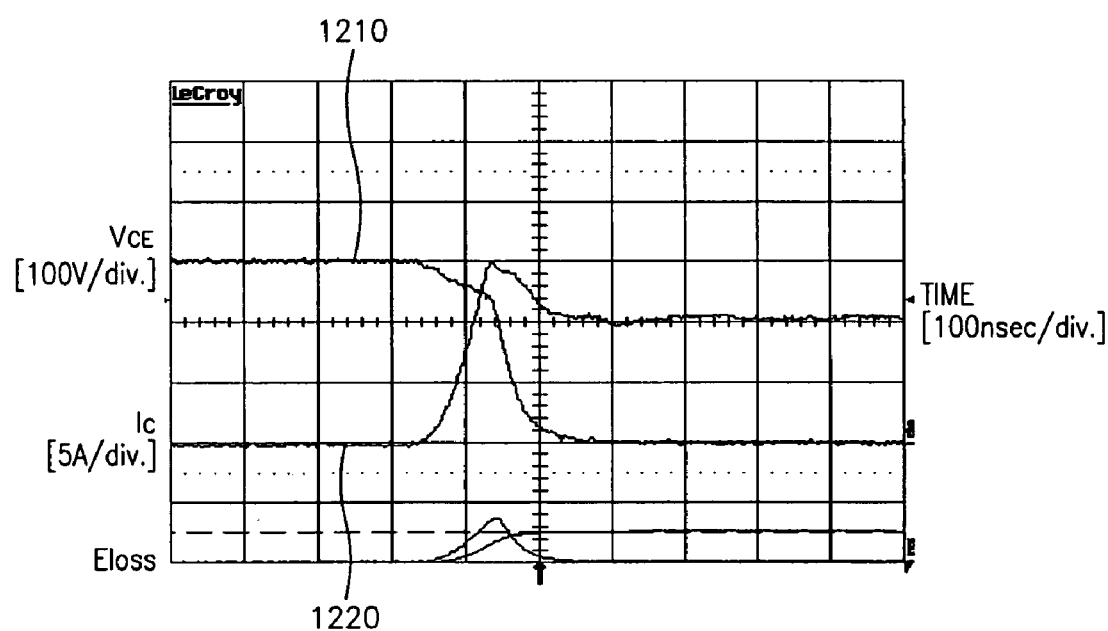
FIG. 12B is a signal diagram showing waveforms for measured collector-emitter voltage, collector current, and energy loss of the IGBT at turn-off in the inverter using the Type B impedance cell shown in FIG. 5, according to an embodiment of the present invention.

FIG. 12A is a signal diagram showing waveforms for collector-emitter voltage $V_{CE}$, collector current $I_C$, and energy loss $E_{loss}$ of the IGBT 130 in the conventional inverter circuit shown in FIG. 1. FIG. 12B is a signal waveform diagram showing collector-emitter voltage $V_{CE}$, collector current $I_C$, and energy loss $E_{loss}$ of the IGBT 430 in the inverter using the Type B impedance cell, shown in FIG. 5, according to an embodiments of the present invention.

In FIG. 12A, the resistance $R_{BS}$ of the bootstrap resistor 152 and the gate series resistor $R_g$ are 100 Ω and 51 Ω, respectively. In FIG. 12B, the resistance $R_{BS}$ of the bootstrap resistor 452 and the equivalent resistance of the impedance cell 440 are 100 Ω and 40 Ω, respectively. In both cases, the DC-link voltage $V_{DC}$ is 300 V, the integrated circuit driving power source $V_{CC}$ is 15 V, and the collector current $I_C$ is 10 A. As shown in FIGS. 12A and 12B, in two cases, the waveforms of the collector-emitter voltage $V_{CE}$ and collector current $I_C$ are similar, and thus the waveform of the energy loss $E_{loss}$ is also similar.

Figure 13A:
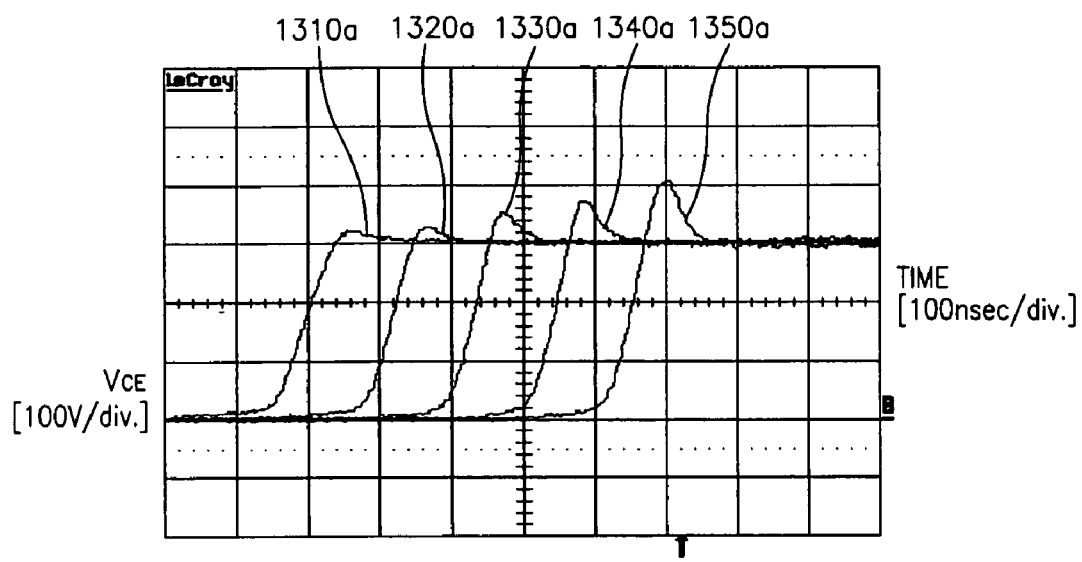
FIG. 13A is a signal diagram showing waveforms for measured collector-emitter voltage of the IGBT at turn-off under the condition of collector current variation in the conventional inverter circuit shown in FIG. 1.
Figure 13B:
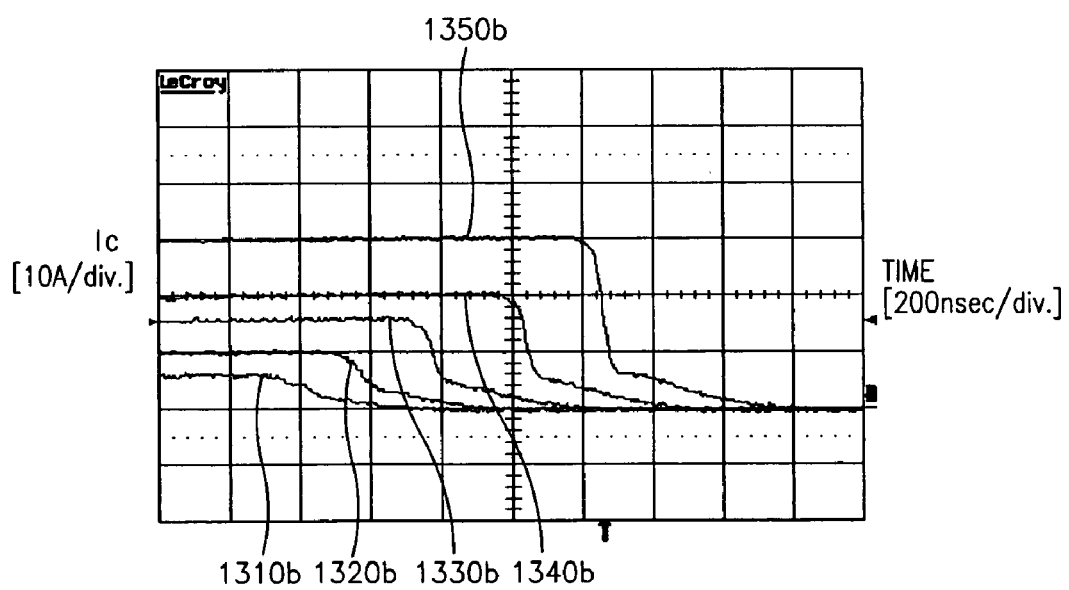
FIG. 13B is a signal diagram showing waveforms for collector current variation of the IGBT at turn-off in the conventional inverter circuit shown in FIG. 1.

FIGS. 13A and 13B are signal diagrams showing waveforms for measured collector-emitter voltage $V_{CE}$ and collector current $I_C$, respectively, of the IGBT 130 at turn-off when there is variation in collector current $I_C$ in the conventional inverter circuit shown in FIG. 1.

In FIGS. 13A and 13B, the resistance $R_{BS}$ of the bootstrap resistor 152 is 100 Ω, the DC-link voltage $V_{DC}$ is 300 V, and the integrated circuit driving power source $V_{CC}$ is 15 V. In FIG. 13A, reference numerals 1310a, 1320a, 1330a, 1340a, and 1350a denote the collector-emitter voltage $V_{CE}$ of the IGBT 130 when the collector current $I_C$ is 5 A, 10 A, 15 A, 20 A, and 30 A, respectively. In FIG. 13B, reference numerals 1310b, 1320b, 1330b, 1340b, and 1350b denote the variation in the collector current $I_C$ at turn-off when the collector current IC is 5 A, 10 A, 15 A, 20 A, and 30 A, respectively.

As shown in FIGS. 13A and 13B, with an increase in current level, turn-off dv/dt increases and current falling time decreases. This result shows general switching characteristics of an IGBT. Accordingly, the over-voltage level is increased by the turn-off current value, resulting in greater potential for latch-on problem due to larger voltage drop at terminal voltage $V_B$.

Figure 14A:
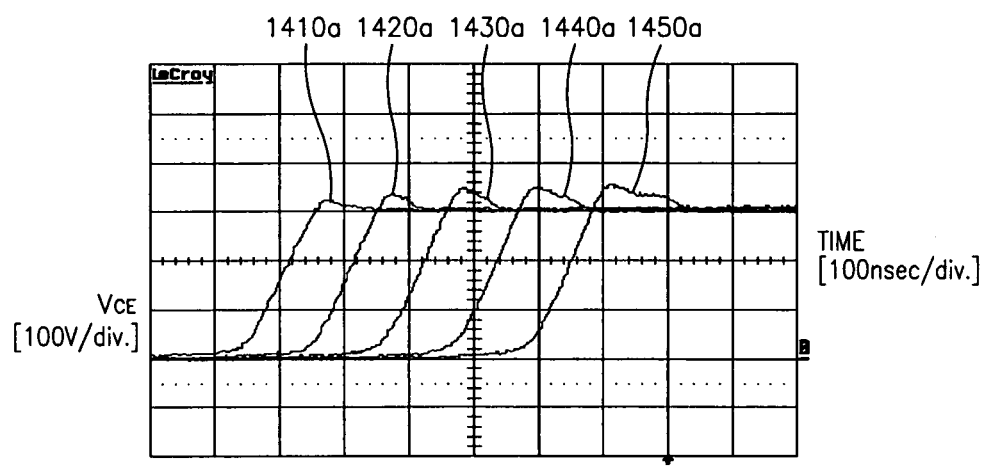
FIG. 14A is a signal diagram showing waveforms for measured collector-emitter voltage of the IGBT at turn-off when there is variation in collector current in the inverter circuit using the Type B impedance cell shown in FIG. 5, according to an embodiment of the present invention.
Figure 14B:
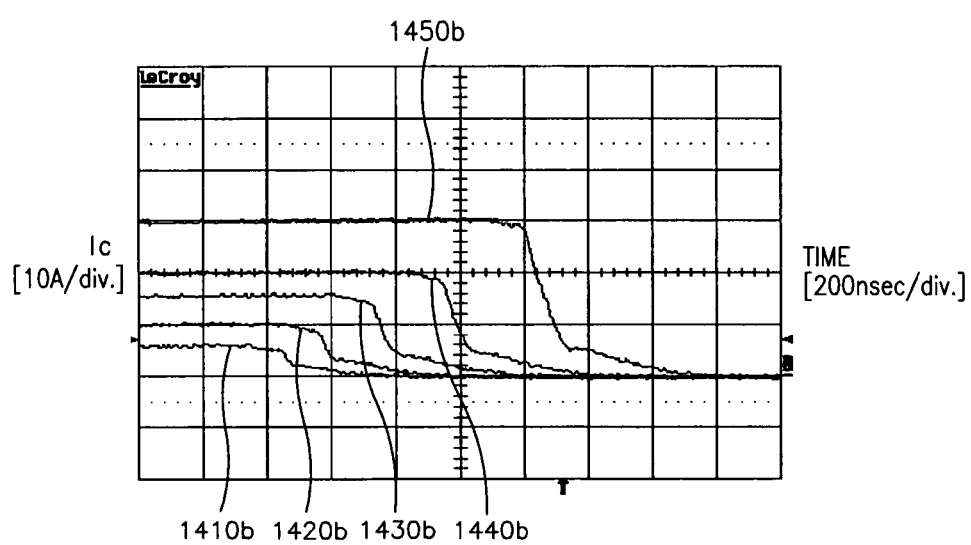
FIG. 14B is a signal diagram showing waveforms for measured collector current of the IGBT at turn-off in the inverter circuit using the Type B impedance cell, shown in FIG. 5, according to an embodiment of the present invention.

FIGS. 14A and 14B are signal diagrams showing waveforms for collector-emitter voltage $V_{CE}$ and collector current $I_C$, respectively, of the IGBT 430 at turn-off when there is variation in collector current $I_C$ in the inverter circuit using the Type B impedance cell, shown in FIG. 5, according to an embodiment of the present invention.

In FIGS. 14A and 14B, in both cases, the resistance $R_{BS}$ of the bootstrap resistor 452 and the equivalent resistance $R_{E(H)}$ of the impedance cell 440 are 100 Ω and 40 Ω, respectively. Also, the DC-link voltage $V_{DC}$ is 300 V and the integrated circuit driving power source $V_{CC}$ is 15 V. In FIG. 14A, reference numerals 1410a, 1420a, 1430a, 1440a, and 1450a denote the collector-voltage voltage $V_{CE}$ of the IGBT 430 when the collector current $I_C$ is 5 A, 10 A, 15 A, 20 A, and 30 A, respectively. In FIG. 14B, reference numerals 1410b, 1420b, 1430b, 1440b, and 1450b denote the collector-voltage voltage $V_{CE}$ of the IGBT 430 when the collector current $I_C$ is 5 A, 10 A, 15 A, 20 A, and 30 A, respectively.

As shown in FIGS. 14A and 14B, when the equivalent resistance $R_{E(H)}$ of 40 Ω is used, it is observed that the voltage rising and current falling times are almost unchanged. That is, dv/dt and di/dt can be actively controlled during turn-off transients by using the equivalent resistance $R_{E(H)}$ of the impedance cell 440. Thus, the desired latch-on immunity control can be also achieved even at large current operating conditions.

Figure 15A:
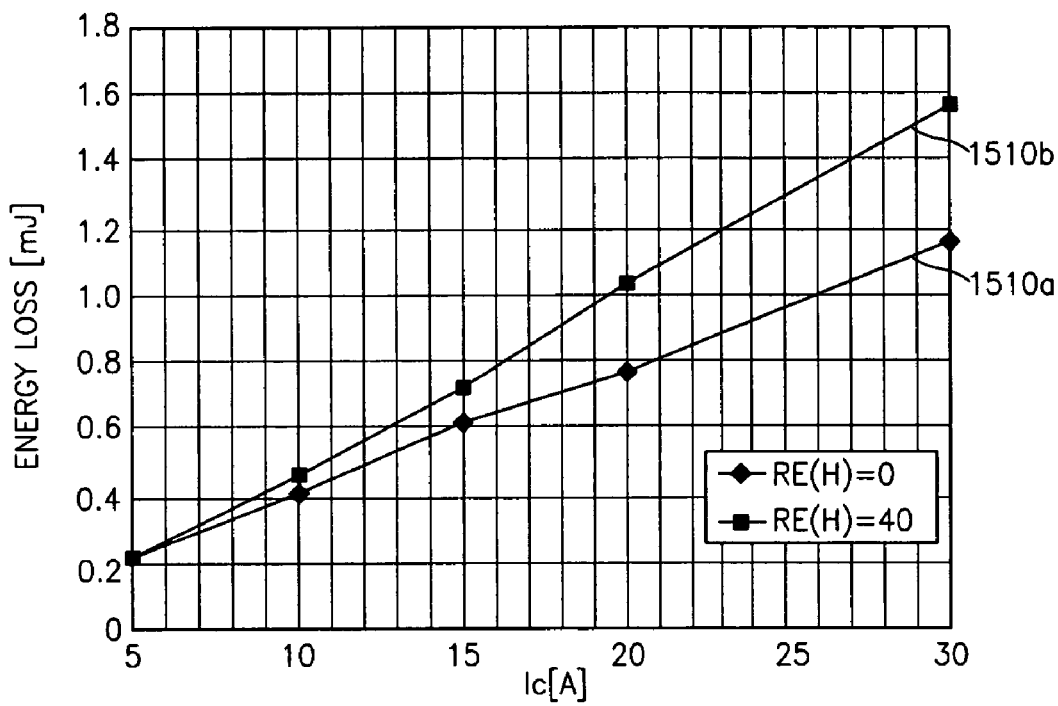
FIG. 15A is a diagram showing measured turn-off energy loss when there is variation of collector current in the IGBT at turn-off in the conventional inverter circuit and the inverter circuit using the Type B impedance cell shown in FIG. 5, according to an embodiment of the present invention.
Figure 15B:
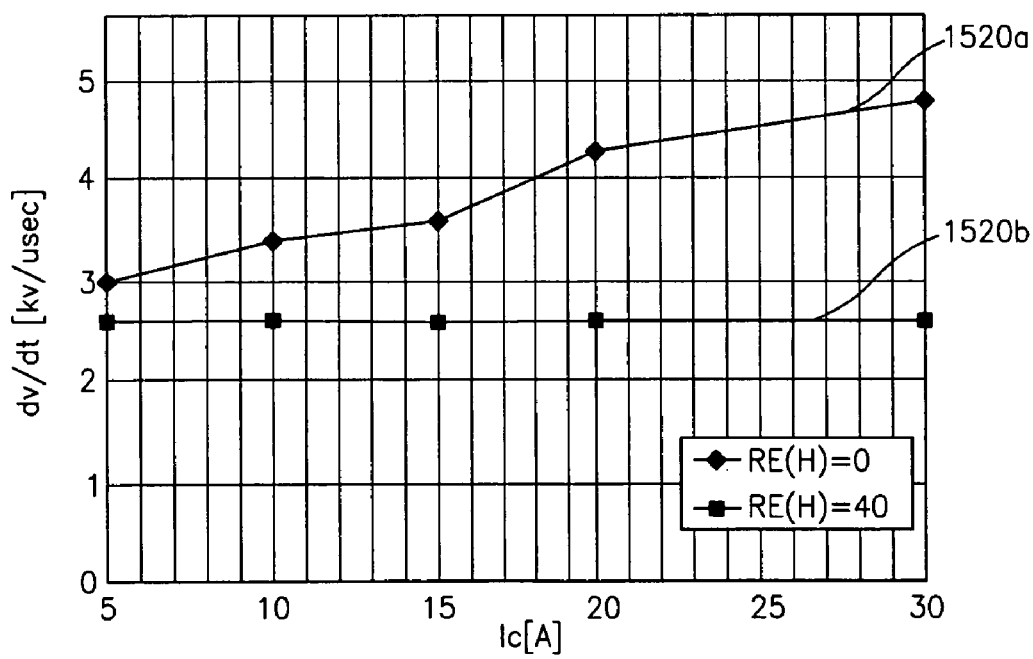
FIG. 15B is a showing measured dv/dt when there is variation in collector current of the IGBT at turn-off in the conventional inverter circuit and the inverter circuit using the Type B impedance cell shown in FIG. 5, according to an embodiment of the present invention.

FIGS. 15A and 15B are diagrams showing turn-off energy loss $E_{loss}$ and dv/dt, respectively, of the IGBT 430 at turn-off when there is variation in collector current $I_C$ in the inverter circuit using the Type B impedance cell, shown in FIG. 5, according to an embodiment of the present invention.

In FIGS. 15A and 15B, reference numerals 1510a and 1520a denote energy loss Eloss and dv/dt, respectively, when the equivalent resistance $R_{E(H)}$ of the impedance cell is 0 Ω in the conventional inverter circuit. Also, reference numerals 1510b and 1520b denote energy loss $E_{loss}$ and dv/dt, respectively, when the equivalent resistance $R_{E(H)}$ of the impedance cell 440 is 40 Ω in the inverter circuit of the present invention. As shown in FIGS. 15A and 15B, in a low operating current area, which is considered as less than the rated current level of around 10 A, even if dv/dt in the inverter circuit of the present invention is much slower, the turn-off energy loss $E_{loss}$ is almost the same. However, in a high current area, the turn-off energy loss $E_{loss}$ becomes larger due to much slower dv/dt and di/dt compared to the conventional inverter circuit.

Hereinafter, the characteristics of the inverter circuit according to an embodiment of the present invention applied in high-performance water pump system with power rating of 300 W will be described with reference to graphs. The inverter circuit included in the high-performance water pump system requires low power and high switching speed. Accordingly, since a latch phenomenon does not occur due to low load current, dv/dt control is an importance consideration in this high-performance water pump. In this inverter circuit, an impedance cell 440 can be implemented as a Type B impedance cell of FIG. 5. However, even if other impedance cells of FIG. 5 are used, similar results can be obtained. In this example, the following design parameters are used. That is, input DC-link voltage $V_{DC}$ is 200–400 V, integrated circuit driving power source $V_{CC}$ is 13–15 V, maximum shut resistance $R_{shunt,max}$ is 200 mΩ, limited maximum load current is 4 A, and switching frequency $F_{SW}$ is 18 kHZ. Also, a high-speed IGBT having a rating of 3 A is used.

Figure 16A:
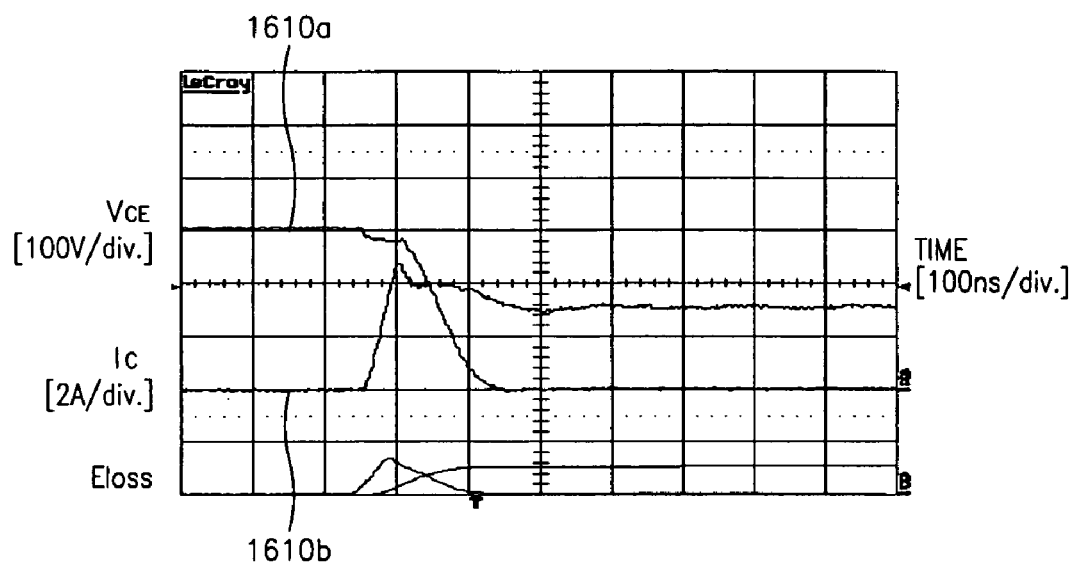
FIG. 16A is a signal diagram showing waveforms for measured collector-emitter voltage $V_{CE}$, collector current $I_C$, and energy loss $E_{loss}$ of the IGBT at turn-on when there is low dv/dt control in the inverter circuit using a Type C impedance cell shown in FIG. 5, according to an embodiment of the present invention.
Figure 16B:
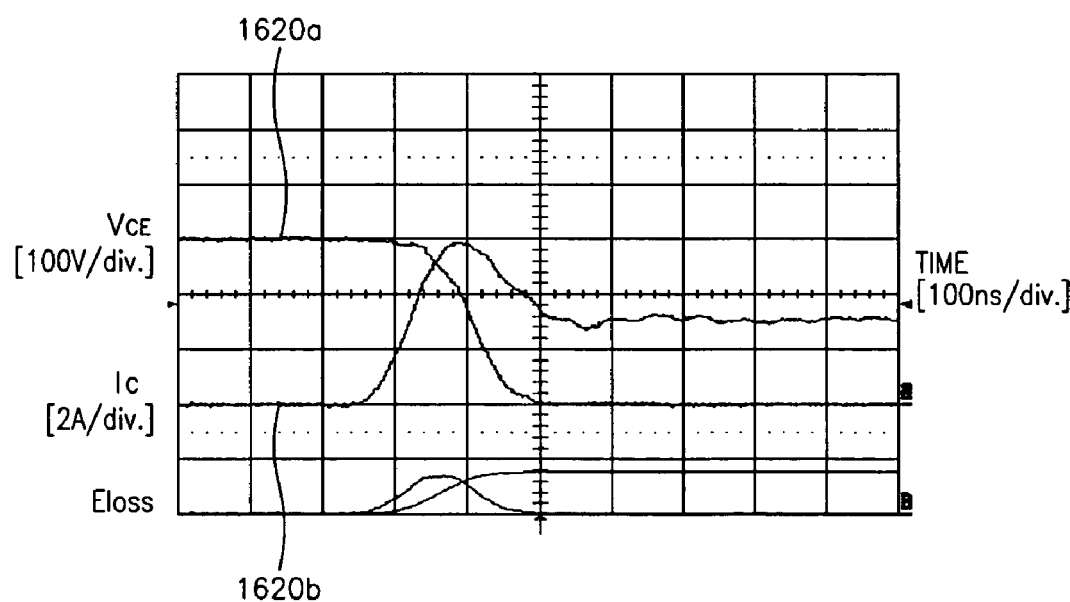
FIG. 16B is a signal diagram showing waveforms for measured collector-emitter voltage $V_{CE}$, collector current $I_C$, and energy loss $E_{loss}$ of the IGBT at turn-on when there is low dv/dt control in the conventional inverter circuit shown in FIG. 1.

FIG. 16A is a signal diagram showing waveforms for measured collector-emitter voltage $V_{CE}$, collector current $I_C$, and energy loss $E_{loss}$ of the IGBT 430 at turn-on when there is low dv/dt control in the inverter circuit using a Type C impedance cell, shown in FIG. 5, according to an embodiment of the present invention, and FIG. 16B is a signal diagram showing waveforms for measured collector-emitter voltage $V_{CE}$, collector current $I_C$, and energy loss $E_{loss}$ of the IGBT 130 at turn-on when there is low dv/dt control in the conventional inverter circuit shown in FIG. 1.

In FIG. 16A, the resistance $R_{BS}$ of the bootstrap resistor 452, the gate series resistance $R_g$, and the equivalent resistance $R_{E(H)}$ of the impedance cell 440 are 51Ω, 51 Ω, and 20 Ω, respectively. In FIG. 16B, the resistance RBS of the bootstrap resistor 152 and the gate series resistance $R_g$ are 51 Ω and 560 Ω, respectively. Also, in FIGS. 16A and 16B, reference numerals 1610a and 1610b denote the collector-emitter voltage $V_{CE}$, and 1620a and 1620b denote the collector current $I_C$. As shown in FIG. 16A, while the inverter circuit according to an embodiment of the present invention suffers energy loss of about 105 μJ, the conventional inverter circuit suffers energy loss of about 155 μJ. Therefore, despite the similar dv/dt slopes, the turn-on switching energy loss in the inverter circuit of one embodiment of the present invention is smaller by about 47% than in the conventional inverter circuit. As a result, in the inverter circuit of one embodiment of the present invention, di/dv is faster at turn-on, and over current caused by reverse-recovery of the freewheeling diode (462 of FIG. 4) decreases. In addition, propagation delay time taken for controlling pulse width modulation (PWM) is shorter.

Figure 17A:
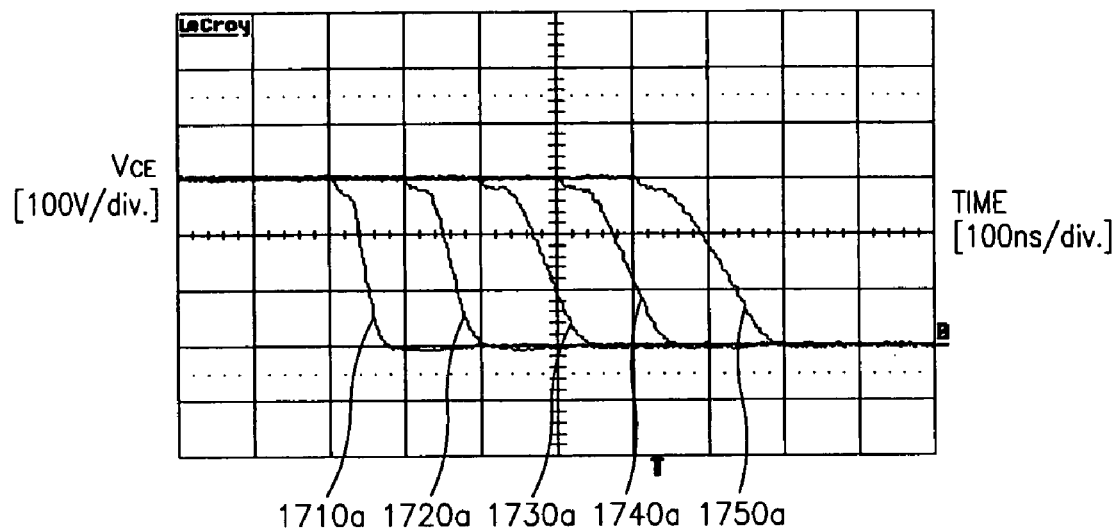
FIG. 17A is a signal diagram showing waveforms for measured collector-emitter voltage of the IGBT at low turn-on current when there is variation in resistance of the impedance cell in the inverter circuit using the Type C impedance cell, shown in FIG. 5, according to an embodiment of the present invention.
Figure 17B:
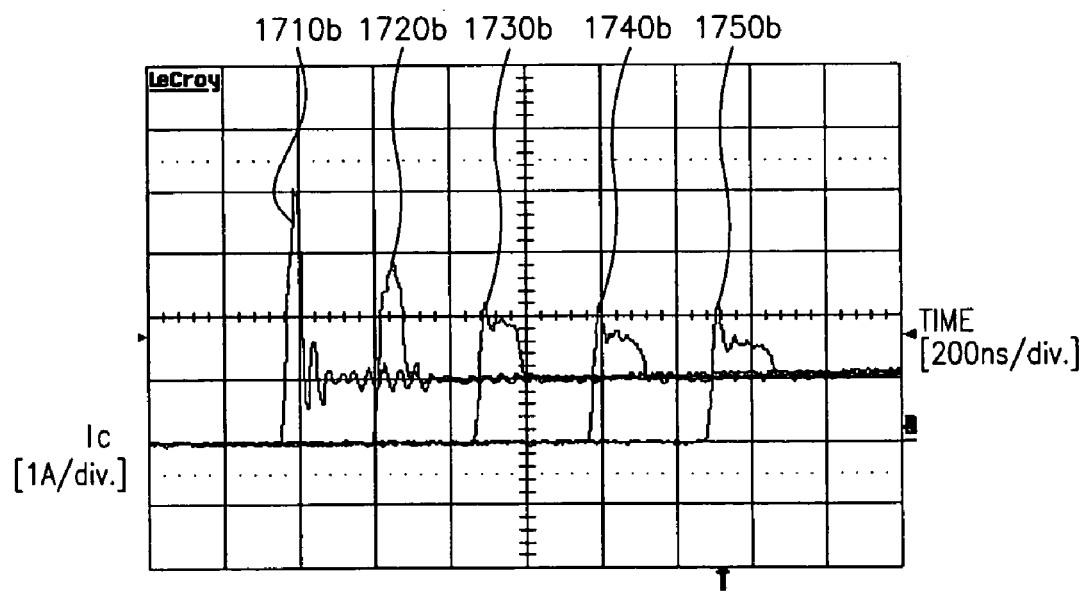
FIG. 17B is a signal diagram showing measured collector current of the IGBT at low turn-on current when there is variation in resistance of the impedance cell in the inverter circuit using the Type C impedance cell shown in FIG. 5, according to an embodiment of the present invention.
Figure 18A:
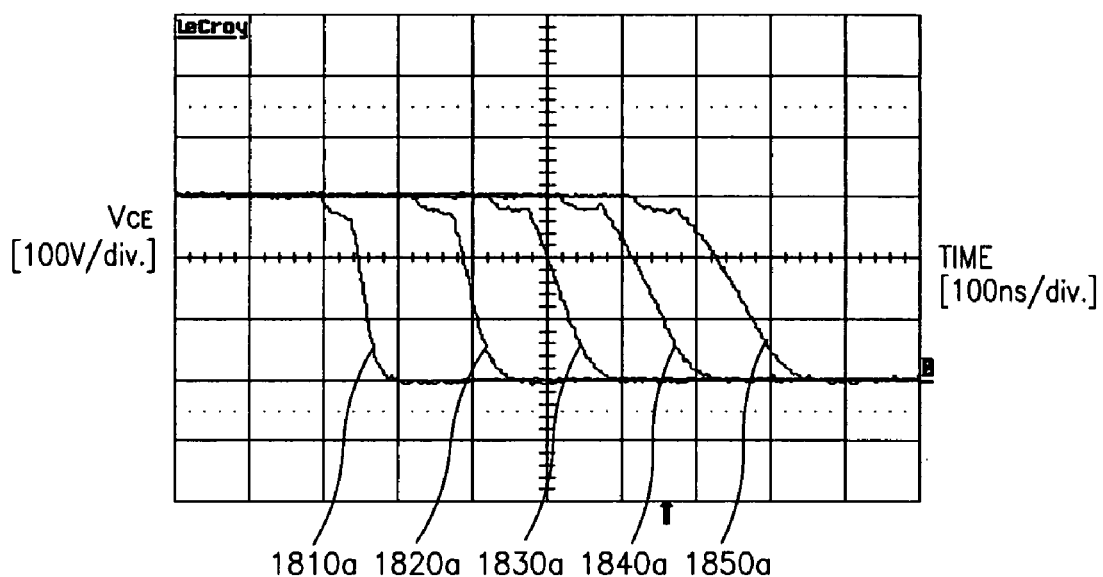
FIG. 18A is a signal diagram showing waveforms for measured collector-emitter voltage of the IGBT at high turn-on current when there is variation in resistance of the impedance cell in the inverter circuit using the Type C impedance cell, shown in FIG. 5, according to the present invention.
Figure 18B:
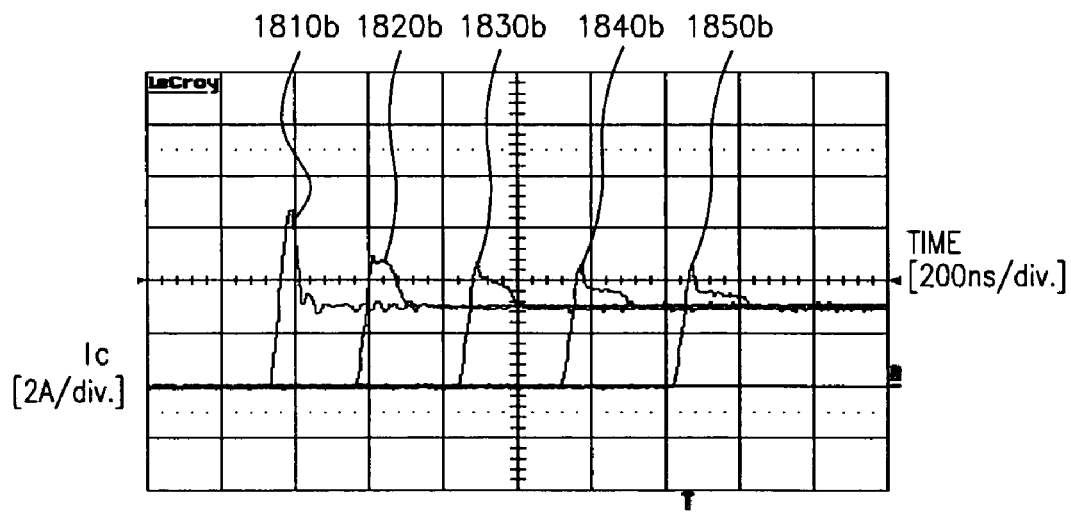
FIG. 18B is a signal waveform diagram showing waveforms for measured collector current of the IGBT at high turn-on current when there is variation in resistance of the impedance cell in the inverter circuit using the Type C impedance cell shown in FIG. 5, according to an embodiment of the present invention.

FIGS. 17A and 17B are signal diagrams showing waveforms for measured collector-emitter voltage $V_{CE}$ and collector current $I_C$, respectively, of the IGBT 430 at low turn-on current when there is variation of equivalent resistance $R_{E(H)}$ of the impedance cell 440 in the inverter circuit using the Type C impedance cell, shown in FIG. 5, according to an embodiment of the present invention. FIGS. 18A and 18B are signal diagrams showing waveforms for collector-emitter voltage $V_{CE}$ and collector current $I_C$, respectively, of the IGBT 430 at high turn-on current when there is variation in equivalent resistance $R_{E(H)}$ of the impedance cell 440 in the inverter circuit using the Type C impedance cell, shown in FIG. 5, according to an embodiment of the present invention.

In FIGS. 17A and 17B, both signal waveforms are obtained under the low turn-on current condition, input DC-link voltage $V_{DC}$ is 300 V, and integrated circuit driving power source $V_{CC}$ is 15 V. In FIG. 17A, reference numerals 1710a, 1720a, 1730a, 1740a, and 1750a denote the collector-emitter voltage $V_{CE}$ when the equivalent resistance $R_{E(H)}$ of the impedance cell 440 is 0 Ω, 10 Ω, 20 Ω, 30 Ω, and 40 Ω, respectively. Likewise, in FIG. 17B, reference numerals 1710b, 1720b, 1730b, 1740b, and 1750b denote the collector current $I_C$ when the equivalent resistance $R_{E(H)}$ of the impedance cell 440 is 0 Ω, 10 Ω, 20 Ω, 30 Ω, and 40 Ω, respectively. In particular, when the equivalent resistance $R_{E(H)}$ of the impedance cell 440 is 0 Ω, the conventional inverter circuit without the impedance cell 440 can be used.

In FIGS. 18A and 18B, both signal waveforms are obtained on the high turn-on current condition, input DC-link voltage $V_{DC}$ is 300 V, and integrated circuit driving power source $V_{CC}$ is 15 V. In FIG. 18A, reference numerals 1810a, 1820a, 1830a, 1840a, and 1850a denote the collector-emitter voltage $V_{CE}$ when the equivalent resistance $R_{E(H)}$ of the impedance cell 440 is 0 Ω, 10 Ω, 20 Ω, 30 Ω, and 40 Ω, respectively. Likewise, in FIG. 18B, reference numerals 1810b, 1820b, 1830b, 1840b, and 1850b denote the collector current $I_C$ when the equivalent resistance $R_{E(H)}$ of the impedance cell 440 is 0 Ω, 10 Ω, 20 Ω, 30 Ω, and 40 Ω, respectively. In particular, when the equivalent resistance $R_{E(H)}$ of the impedance cell 440 is 0 Ω, the conventional inverter circuit without the impedance cell 440 can be used.

As shown in FIGS. 17A and 17B and FIGS. 18A and 18B, as the equivalent resistance $R_{E(H)}$ of the impedance cell 440 increases, dv/dt is significantly reduced to about 2, for example, kV/μs or lower. When the IGBT 430 is turned on, dv/dt in a condition where a turn-on current is low (FIGS. 17A and 17B) is higher than that in a condition where a turn-on current is high (FIGS. 18A and 18B). By adjusting the equivalent resistance $R_{E(H)}$ of the impedance cell 440, the maximum turn-on current can be reduced but the turn-on di/dv slope is not affected. This is because the equivalent resistance $R_{E(H)}$ of the impedance cell 440 is not higher than the gate resistance and thus the turn-on energy loss and the propagation delay time decrease to the minimum.

Figure 19A:
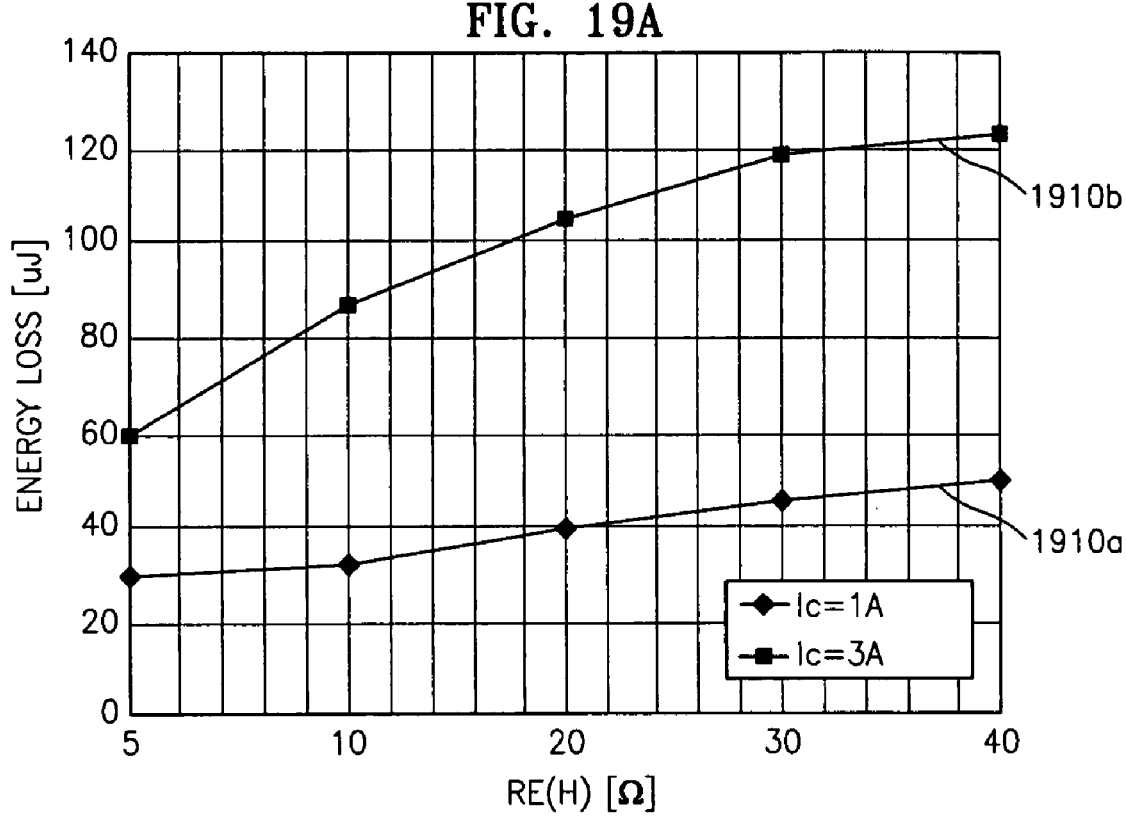
FIG. 19A is a diagram showing turn-on energy loss when there is variation in resistance of the impedance cell in the inverter circuit using the Type C impedance cell shown in FIG. 5, according to an embodiment of the present invention.
Figure 19B:
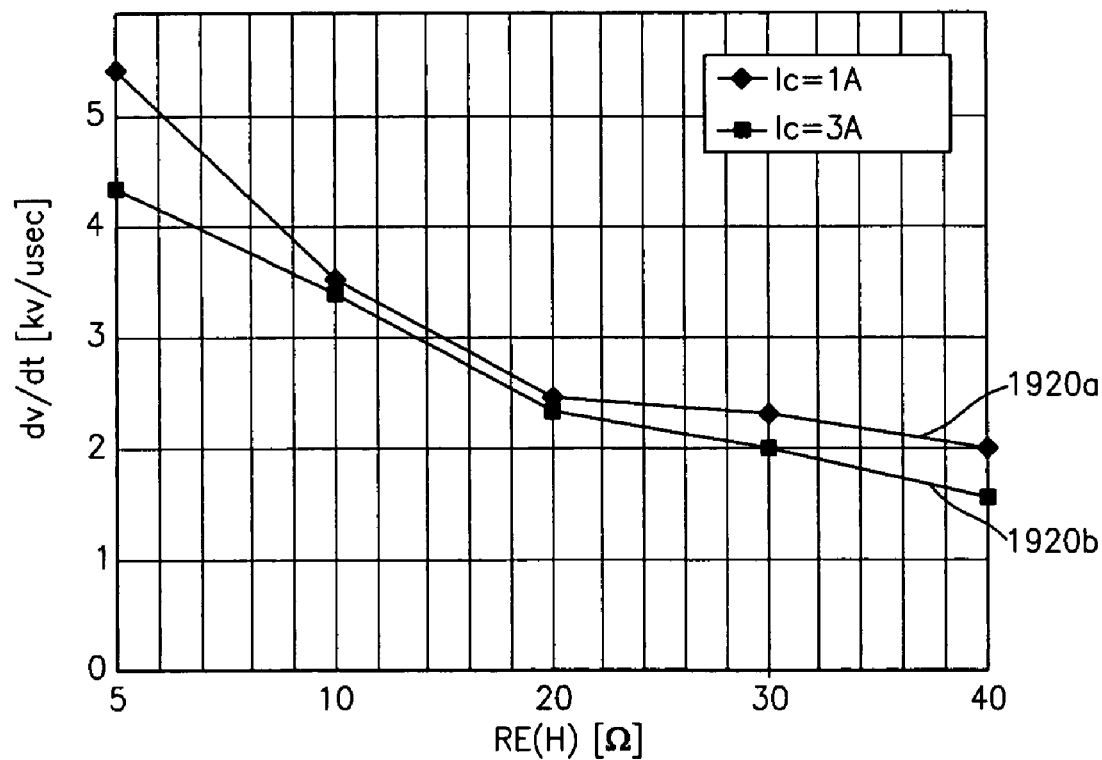
FIG. 19B is a diagram showing dv/dt when there is variation in resistance of the impedance cell in the inverter circuit using the Type C impedance cell shown in FIG. 5, according to an embodiment of the present invention.

FIGS. 19A and 19B are diagrams showing turn-on energy loss and dv/dt, respectively, when there is variation in equivalent resistance $R_{E(H)}$ of the impedance cell 440 in the inverter circuit using the Type C impedance cell, shown in FIG. 5, according to an embodiment of the present invention.

In FIGS. 19A and 19B, input DC-link voltage $V_{DC}$ is 300 V, integrated circuit driving power source $V_{CC}$ is 15 V, and operating temperature TC is 25° C. In FIG. 19A, reference numerals 1910a and 1910b denote the energy loss when the collector current $I_C$ is 1 A and 3 A, respectively. Likewise, in FIG. 19B, reference numerals 1920a and 1920b denote dv/dt when the collector current $I_C$ is 1 A and 3 A, respectively. As shown in FIGS. 19A and 19B, when the equivalent resistance $R_{E(H)}$ of the impedance cell 440 is 10 Ω or less, the dv/dt is almost constantly held. For example, when the equivalent resistance $R_{E(H)}$ of the impedance cell 440 is about 20 Ω, the turn-on dv/dt is about 2.5 kV/μs irrespective of current.

When the IGBT is turned off, high current generates a high turn-off dv/dt, which is contrary to when the IGBT is turned on. Thus, turn-off dv/dt at a low current causes no problem to the IGBT inverter but high current is a consideration.

Figure 20A:
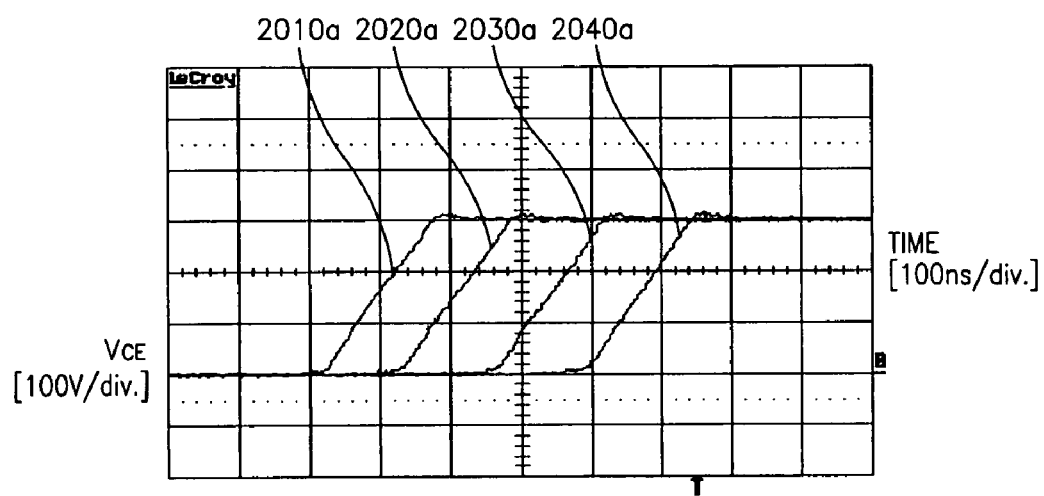
FIG. 20A is a signal diagram showing measured collector-emitter voltage of the IGBT at low turn-off current when there is variation in resistance of the impedance cell in the inverter circuit using the Type B impedance cell shown in FIG. 5, according to an embodiment of the present invention.
Figure 20B:
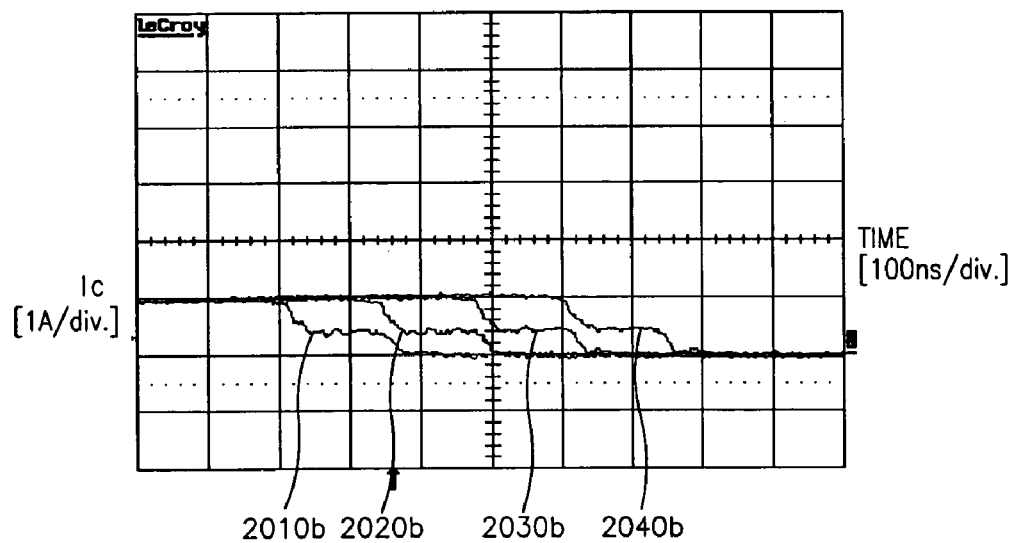
FIG. 20B is a signal diagram showing measured collector current of the IGBT at low turn-on current when there is variation in resistance of the impedance cell in the inverter circuit using the Type B impedance cell shown in FIG. 5, according to an embodiment of the present invention.
Figure 21A:
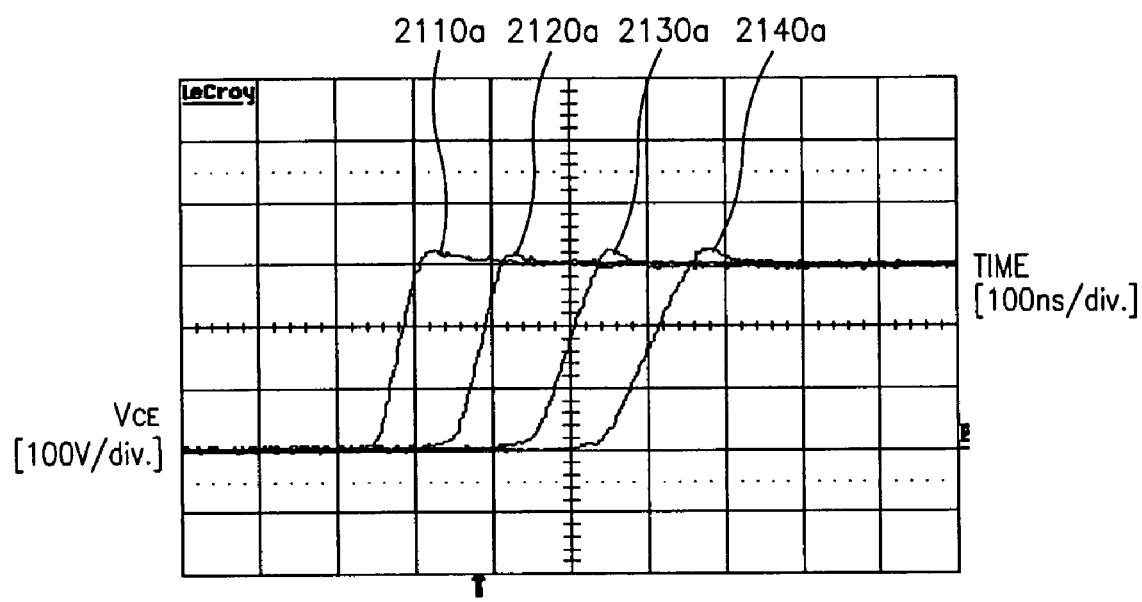
FIG. 21A is a signal diagram showing measured collector-emitter voltage of the IGBT at high turn-off current when there is variation in resistance of the impedance cell in the inverter circuit using the Type B impedance cell shown in FIG. 5, according to an embodiment of the present invention.
Figure 21B:
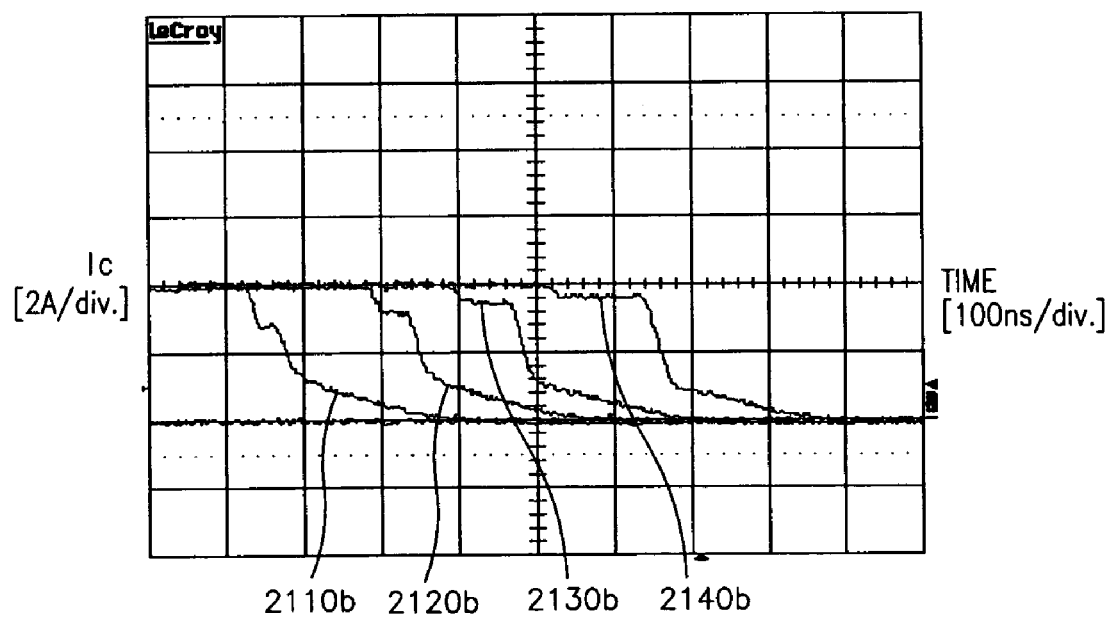
FIG. 21B is a signal diagram showing measured collector current of the IGBT at high turn-off current when there is variation in resistance of the impedance cell in the inverter circuit using the Type B impedance cell shown in FIG. 5, according to an embodiment of the present invention.

FIGS. 20A and 20B are signal diagrams showing waveforms for collector-emitter voltage $V_{CE}$ and collector current $I_C$, respectively, of the IGBT 430 at low turn-off current when there is variation in equivalent resistance $R_{E(H)}$ of the impedance cell 440 in the inverter circuit using the Type B impedance cell, shown in FIG. 5, according to an embodiment of the present invention. Also, FIGS. 21A and 21B are signal diagrams showing waveforms for collector-emitter voltage $V_{CE}$ and collector current $I_C$, respectively, of the IGBT at high turn-off current when there is variation in equivalent resistance $R_{E(H)}$ of the impedance cell 440 in the inverter circuit using the Type B impedance cell, shown in FIG. 5, according to an embodiment of the present invention. Also, FIGS. 22A and 22B are diagrams showing turn-off energy loss and dv/dt, respectively, when there is variation in equivalent resistance $R_{E(H)}$ of impedance cell 440 in the inverter circuit using the Type B impedance cell, shown in FIG. 5, according to an embodiment of the present invention.

In FIGS. 20A and 20B, the both signal waveforms are obtained in a condition where turn-on current is as low as 1 A, input DC-link voltage $V_{DC}$ is 300 V, and integrated circuit driving power source $V_{CC}$ is 15 V. In FIG. 20A, reference numerals 2010a, 2020a, 2030a, and 2040a denote the collector-emitter voltage $V_{CE}$ when the equivalent resistance $R_{E(H)}$ of the impedance cell 440 is 0 Ω, 20 Ω, 40 Ω, and 68 Ω, respectively. Likewise, in FIG. 20B, reference numerals 2010b, 2020b, 2030b, and 2040b denote the collector current $I_C$ when the equivalent resistance $R_{E(H)}$ of the impedance cell 440 is 0 Ω, 20 Ω, 40 Ω, and 68 Ω, respectively. In particular, when the equivalent resistance $R_{E(H)}$ of the impedance cell 440 is 0 Ω, the conventional inverter circuit without the impedance cell 440 can be used.

In FIGS. 21A and 21B, the both signal waveforms are obtained in a condition where turn-on current is as low as 4 A, input DC-link voltage $V_{DC}$ is 300 V, and integrated circuit driving power source $V_{CC}$ is 15 V. In FIG. 21A, reference numerals 2110a, 2120a, 2130a, and 2140a denote the collector-emitter voltage $V_{CE}$ when the equivalent resistance $R_{E(H)}$ of the impedance cell 440 is 0 Ω, 20 Ω, 40 Ω, and 68 Ω, respectively. Likewise, in FIG. 21B, reference numerals 21 10b, 2120b, 2130b, and 2140b denote the collector current IC when the equivalent resistance $R_{E(H)}$ of the impedance cell 440 is 0 Ω, 20 Ω, 40 Ω, and 68 Ω, respectively. In particular, when the equivalent resistance $R_{E(H)}$ of the impedance cell 440 is 0 Ω, the conventional inverter circuit without the impedance cell 440 can be used.

Figure 22A:
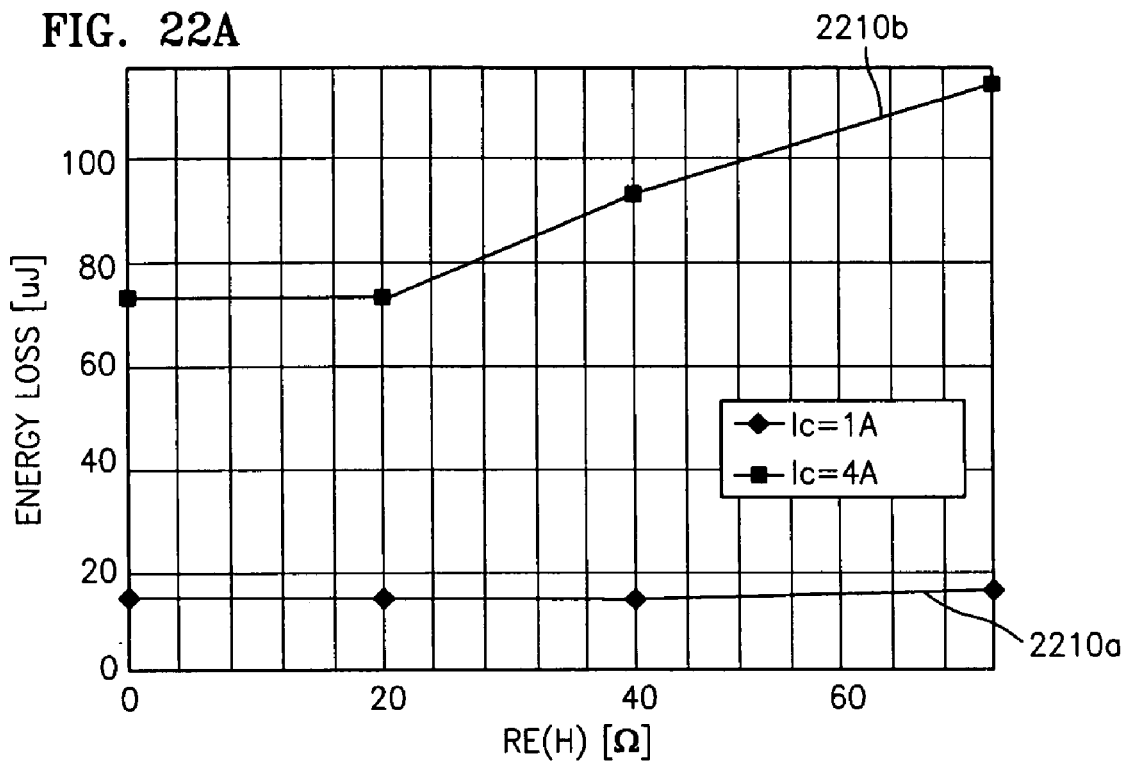
FIG. 22A is a diagram showing turn-off energy loss when there is variation in resistance of impedance cell in the inverter circuit using the Type B impedance cell shown in FIG. 5, according to an embodiment of the present invention.
Figure 22B:
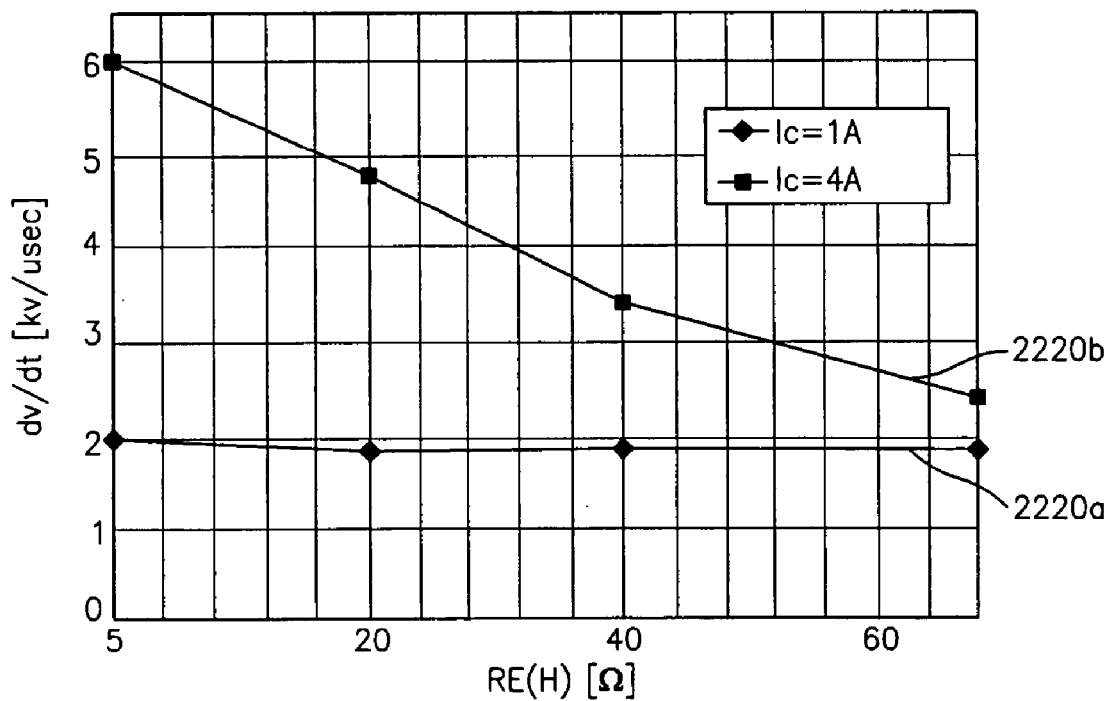
FIG. 22B is a graph showing dv/dt when there is variation in resistance of the impedance cell in the inverter circuit using the Type B impedance cell, shown in FIG. 5, according to the present invention.

Next, in FIGS. 22A and 22B, input DC-link voltage $V_{DC}$ is 300 V, integrated circuit driving power source $V_{CC}$ is 15 V, and operating temperature TC is 25° C. In FIG. 22A, reference numerals 2210a and 2210b denote the energy loss when the collector current $I_C$ is 1 A and 4 A, respectively. Likewise, in FIG. 22B, reference numerals 2220a and 2220b denote dv/dt when the collector current $I_C$ is 1 A and 4 A, respectively.

As shown in FIGS. 20A and 20B and FIGS. 22A and 22B, when the turn-off current is as low as 1 A, the equivalent resistance $R_{E(H)}$ of the impedance cell 440 does not affect the dv/dt control. In practical use, the dv/dt of about 1.5 kV/μs or less is negligible. Also, as shown in FIGS. 21A and 21B, when the turn-off current is as high as 4 A and the equivalent resistance $R_{E(H)}$ of the impedance cell 440 is about 20 Ω or higher, the turn-off dv/dt is reduced.

In typical applications such as a servo-driving system, detecting output current in an inverter is required in order to control current and protect a ground-short. If a ground-short occurs, an induced high current may latch on an HVIC at turn-off, thereby damaging the entire system.

Figure 23:
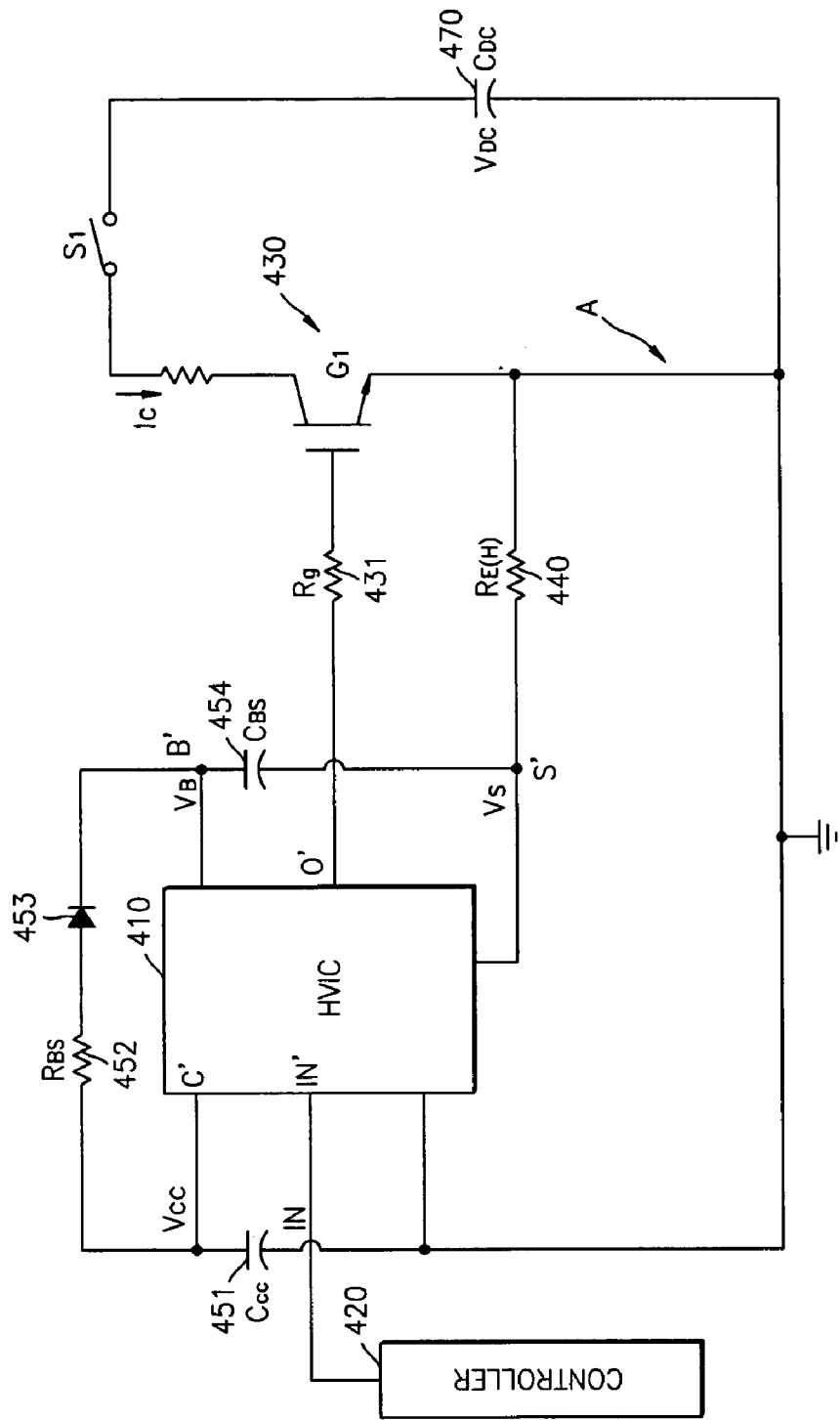
FIG. 23 is a schematic diagram of the inverter circuit according to an embodiment of the present invention when a ground-short occurs.
Figure 24A:
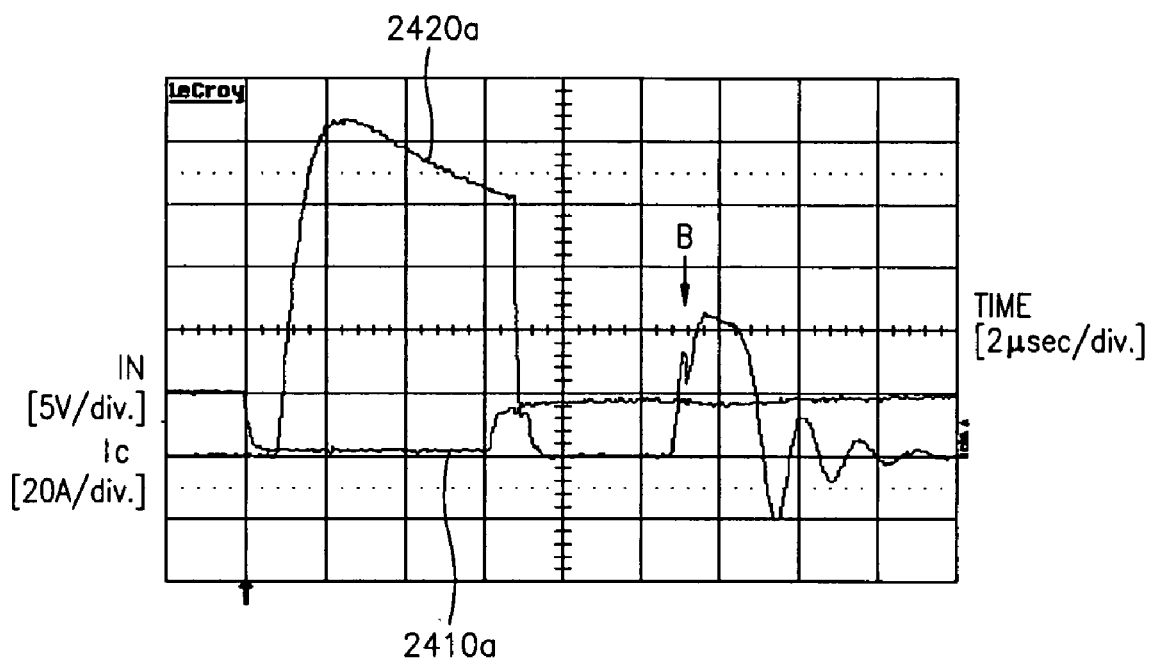
FIG. 24A is a signal diagram showing waveforms for an input control signal and collector current in the conventional inverter circuit when a ground-short occurs.
Figure 24B:
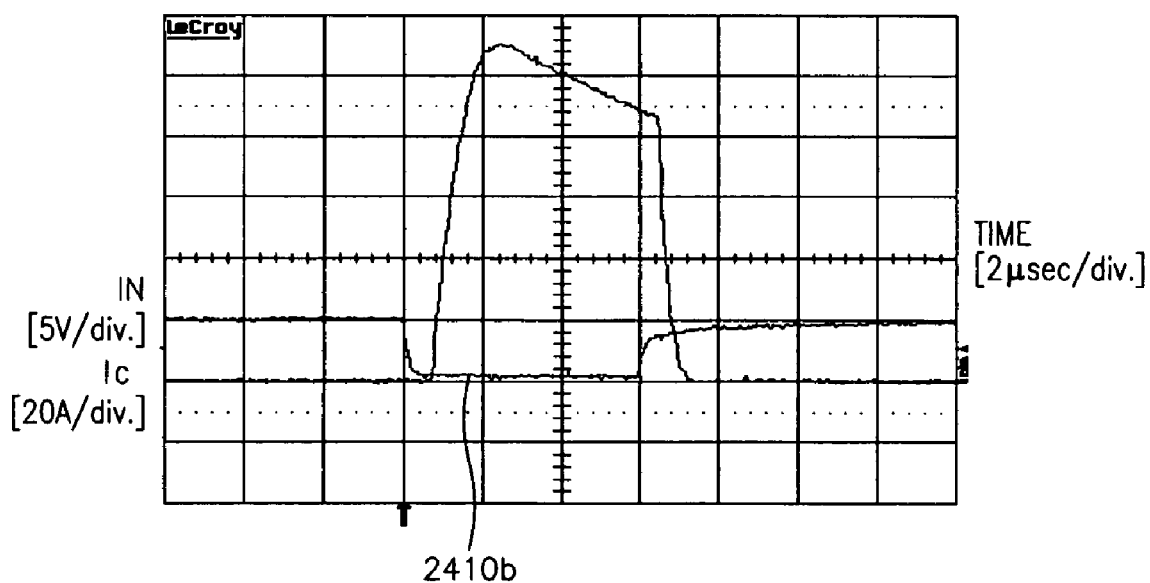
FIG. 24B is a signal diagram showing waveforms for an input control signal and collector current in the inverter circuit according to an embodiment of the present invention, when a ground-short occurs.

FIG. 23 is a schematic diagram of an example of the inverter circuit according to an embodiment of the present invention. Specifically, FIG. 23 is a circuit diagram of the inverter circuit using the Type A impedance cell 440 when a ground-short occurs. In FIG. 23, the same reference numerals as in FIG. 4 denote the same elements. Also, FIG. 24A is a signal diagram showing waveforms for an input control signal IN and collector current $I_C$ in the conventional inverter circuit when a ground-short occurs, and FIG. 24B is a signal diagram showing waveforms for an input control signal IN and collector current $I_C$ in the inverter circuit according to an embodiment of the present invention when a ground-short occurs.

As shown in FIG. 23, if a ground-short denoted by "A" occurs, an emitter terminal of the IGBT 430 (or one terminal of the impedance cell 440) is grounded. Then, as shown in FIG. 24A, when the equivalent resistance $R_{E(H)}$ of the impedance cell 440 is about 0 Ω in the conventional inverter circuit, high di/dt occurs due to a high negative voltage drop at node B. Thus, latch-on occurs while the IGBT 430 is being turned off. However, as shown in FIG. 24B, when the equivalent resistance $R_{E(H)}$ of the impedance cell 440 is about 40 Ω in the inverter circuit of one embodiment of the present invention, the latch-on does not occur. In the two cases, while the IGBT is being turned off, maximum current level is similar but current falling time differs.

As explained herein, the inverter circuit of some embodiments of the present invention includes an IGBT as a switching device, in which an impedance cell is located between an output terminal of an HVIC for generating a gate control signal and an emitter terminal of the IGBT. Thus, the voltage drop is reduced at one output terminal of the HVIC. As a result, both the latch-on and the latch-up can be suppressed and the dv/dt can be effectively controlled.

While the present invention has been particularly shown and described with reference to preferred embodiments thereof, it will be understood by those of ordinary skill in the art that various changes in form and details may be made therein without departing from the spirit and scope of the present invention as defined by the following claims. For example, a metal oxide semiconductor field effect transistor (MOSFET) can be used as a switching device in place of an IGBT. In this case, a drain and a source of the MOSFET can take place of a collector and an emitter of the IGBT.

What is claimed is:

1. An inverter circuit comprising:
   a switching device operable to perform a switching operation corresponding to a gate control signal input to a gate terminal, convert an input direct current to an alternating current, and output the alternating current;
   an HVIC operable to input the gate control signal to the gate terminal of the switching device;
   a controller operable to input to the HVIC a control signal for enabling the HVIC to generate the gate control signal; and
   an impedance cell located between the HVIC and one terminal of the switching device operable to reduce voltage drop when the switching device turns off and operable to reduce transition speed when the switching device turns on.

2. The circuit of claim 1, wherein the switching device comprises an insulated gate bipolar transistor having a collector terminal and an emitter terminal, wherein the collector terminal is coupled to a direct current input power source and emitter terminal is connected to an output terminal.

3. The circuit of claim 2, wherein the impedance cell is located between the HVIC and the emitter terminal of the insulated gate bipolar transistor.

4. The circuit of claim 1, wherein the switching device comprises an MOS field effect transistor having a drain terminal and a source terminal, wherein the drain terminal is connected to a direct current input power source and the source terminal is coupled to an output terminal.

5. The circuit of claim 4, wherein the impedance cell is disposed between the HVIC and the source terminal of the MOS field effect transistor.

6. The circuit of claim 1, further comprising a bootstrap circuit operable to transmit energy to a high-side region of the HVIC.

7. The circuit of claim 6, wherein the bootstrap circuit comprises:
- a power source;
- a bootstrap resistor connected in series to the power source;
- a bootstrap diode having an anode terminal connected in series to the bootstrap resistor and having a cathode terminal opposite the anode terminal; and
- a bootstrap capacitor connected to both the cathode terminal of the bootstrap diode
- and a node that is commonly connected to the HVIC and the impedance cell.

8. The circuit of claim 1, wherein the impedance cell comprises a resistor.

9. The circuit of claim 1, wherein the impedance cell comprises a resistor and a diode connected in parallel.

10. The circuit of claim 9, wherein the diode is located such that an anode terminal of the diode is connected to the switching device and a cathode terminal of the diode is connected to the HVIC.

11. The circuit of claim 9, wherein the diode is located such that the anode terminal of the diode is connected to the HVIC and the cathode terminal of the diode is connected to the switching device.

12. The circuit of claim 1, wherein the impedance cell comprises a first resistor, a second resistor connected to the first resistor in parallel, and a diode connected to the first resistor in parallel and to the second resistor in series.

13. The circuit of claim 12, wherein the diode is located such that an anode terminal of the diode is connected to the switching device and a cathode terminal of the diode is connected to the HVIC through the second resistor.

14. The circuit of claim 12, wherein the diode is located such that the anode terminal of the diode is connected to the HVIC through the second resistor and the cathode terminal of the diode is connected to the switching device.

* * * * *